(12) United States Patent
Jiang

(10) Patent No.: US 11,747,953 B2
(45) Date of Patent: Sep. 5, 2023

(54) DISPLAY METHOD AND ELECTRONIC DEVICE

(71) Applicant: Huawei Technologies Co., Ltd., Shenzhen (CN)

(72) Inventor: Xiuping Jiang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/631,022

(22) PCT Filed: Jul. 29, 2020

(86) PCT No.: PCT/CN2020/105569
§ 371 (c)(1),
(2) Date: Jan. 28, 2022

(87) PCT Pub. No.: WO2021/018211
PCT Pub. Date: Feb. 4, 2021

(65) Prior Publication Data
US 2022/0269379 A1 Aug. 25, 2022

(30) Foreign Application Priority Data

Jul. 29, 2019 (CN) .......................... 201910691471.4

(51) Int. Cl.
*G06F 3/048* (2013.01)
*G06F 3/0481* (2022.01)
(Continued)

(52) U.S. Cl.
CPC .......... *G06F 3/0481* (2013.01); *G06F 3/0486* (2013.01); *G06F 3/04845* (2013.01); *G06F 2203/04803* (2013.01)

(58) Field of Classification Search
CPC .. G06F 3/0481; G06F 3/04845; G06F 3/0486; G06F 2203/04803
See application file for complete search history.

(56) References Cited

U.S. PATENT DOCUMENTS 5,920,315 A * 7/1999 Santos-Gomez ..... G06F 3/0481
715/792
7,873,622 B1 * 1/2011 Karls ...................... H10B 61/00
707/707
(Continued)

FOREIGN PATENT DOCUMENTS

| CN | 103729106 A | 4/2014 |
|---|---|---|
| CN | 103955329 A | 7/2014 |

(Continued)

*Primary Examiner* — Rashawn N Tillery
(74) *Attorney, Agent, or Firm* — SLATER MATSIL, LLP

(57) ABSTRACT

A method, including displaying, by an electronic device, a window preview region in a first region of a display having the first region, a second region and a third region, where the first, second and third regions do not overlap, and the second and third region are larger than the first region, displaying a first user interface in the third region, displaying a second user interface in the second region, detecting a first operation and displaying a first window of the first user interface in the window preview region, detecting a second operation and displaying a third user interface of the first application in the third region, detecting a fourth operation associated with displaying the first user interface in at least one of the second region or the third region, and switching, in response to the fourth operation, the second or third user interface to the first user interface.

20 Claims, 35 Drawing Sheets

(51) Int. Cl.
*G06F 3/04845* (2022.01)
*G06F 3/0486* (2013.01)

(56) References Cited

U.S. PATENT DOCUMENTS

| | | | | |
|---|---|---|---|---|
| 8,341,143 | B1 * | 12/2012 | Karls | G06F 16/9038 |
| | | | | 707/708 |
| 9,489,078 | B2 * | 11/2016 | Seo | G06F 3/0488 |
| 9,852,761 | B2 * | 12/2017 | Anzures | G06Q 10/107 |
| 10,585,553 | B2 * | 3/2020 | Kim | G06F 3/0488 |
| 2005/0108655 | A1 | 5/2005 | Andrea et al. | |
| 2008/0235594 | A1 | 9/2008 | Bhumkar et al. | |
| 2011/0087989 | A1 * | 4/2011 | McCann | G06F 3/04842 |
| | | | | 715/811 |
| 2012/0117495 | A1 * | 5/2012 | Sirpal | G06F 1/1616 |
| | | | | 715/761 |
| 2013/0187861 | A1 * | 7/2013 | Lavallee | G06F 3/0486 |
| | | | | 345/173 |
| 2013/0263042 | A1 * | 10/2013 | Buening | G06F 3/04883 |
| | | | | 715/783 |
| 2014/0036291 | A1 * | 2/2014 | Fujishita | H04N 1/00424 |
| | | | | 358/1.13 |
| 2014/0208250 | A1 * | 7/2014 | Ording | G06F 3/04883 |
| | | | | 715/769 |
| 2014/0337794 | A1 * | 11/2014 | Vranjes | G06F 9/451 |
| | | | | 715/800 |
| 2014/0351748 | A1 * | 11/2014 | Xia | G06F 3/04847 |
| | | | | 715/798 |
| 2015/0046871 | A1 * | 2/2015 | Lewis | G06F 3/04883 |
| | | | | 715/798 |
| 2015/0286344 | A1 * | 10/2015 | Kaufthal | G06F 3/0481 |
| | | | | 715/788 |
| 2016/0034157 | A1 * | 2/2016 | Vranjes | G06F 3/04883 |
| | | | | 715/798 |
| 2017/0357437 | A1 * | 12/2017 | Peterson | G06F 40/134 |
| 2018/0246622 | A1 * | 8/2018 | Lee | G06F 3/0482 |
| 2020/0326839 | A1 * | 10/2020 | Walkin | G06F 3/04845 |
| 2020/0371685 | A1 * | 11/2020 | Wang | G06F 3/04845 |
| 2021/0389873 | A1 * | 12/2021 | Chen | G06F 3/0412 |
| 2021/0405828 | A1 * | 12/2021 | Jiang | G06Q 30/0643 |
| 2022/0321795 | A1 * | 10/2022 | Jiang | H04N 23/62 |
| 2022/0326842 | A1 * | 10/2022 | Rogers | G06F 3/0482 |
| 2022/0357818 | A1 * | 11/2022 | Xiong | H04M 1/72403 |

FOREIGN PATENT DOCUMENTS

| | | |
|---|---|---|
| CN | 107256118 A | 10/2017 |
| CN | 107678826 A | 2/2018 |
| CN | 107704177 A | 2/2018 |
| CN | 107870784 A | 4/2018 |
| CN | 109814766 A | 5/2019 |
| CN | 109917956 A | 6/2019 |
| CN | 109918072 A | 6/2019 |
| CN | 109992227 A | 7/2019 |
| CN | 110569094 A | 12/2019 |
| EP | 3499355 A1 | 6/2019 |

\* cited by examiner

DISPLAY METHOD AND ELECTRONIC DEVICE

CROSS REFERENCE TO RELATED APPLICATIONS

This application is a national stage of International Application No. PCT/CN2020/105569, filed on Jul. 29, 2020, which claims priority to Chinese Patent Application No. 201910691471.4, filed on Jul. 29, 2019. Both of the aforementioned applications are hereby incorporated by reference in their entireties.

TECHNICAL FIELD

This application relates to the field of terminal technologies, and in particular, to a display method and an electronic device.

BACKGROUND

Currently, when using an application installed on an electronic device, for example, a mobile phone or a tablet computer, a user usually needs to switch user interfaces displayed on a display, to meet different requirements of the user. An application may include user interfaces at different levels, and the application may also include a plurality of user interfaces at a same level. In the conventional technology, when user interfaces at a same level or user interfaces at a plurality of levels of a same application are switched, the user may need to operate the electronic device at least twice. This is complex, and results in poor user experience.

SUMMARY

Embodiments of this application provide a display method and an electronic device, to help simplify an operation performed when a user switches different user interfaces of a same application, and improve efficiency of switching the different user interfaces of the same application by the user.

According to a first aspect, an embodiment of this application provides a display method. The method includes: An electronic device displays a window preview region in a first region of a display. The window preview region includes a first window, and the first window is a window associated with a first user interface of a first application. The electronic device displays a second user interface of the first application in a second region of the display. The first region does not overlap the second region. The electronic device detects a first operation performed on the first window. The first operation is used to display the first user interface in the second region. The electronic device switches, in response to the first operation, the second user interface displayed in the second region to the first user interface associated with the first window.

In this embodiment of this application, because the window preview region is introduced, a user may perform the first operation on the first window in the window preview region, so that the second user interface displayed on the display is switched to the first user interface associated with the first window. In this way, the user can switch different user interfaces of a same application by only operating once. This helps simplify an operation performed when the user switches the different user interfaces of the same application, and improve user interface switching efficiency.

In a possible design, the first operation is an operation of dragging the first window into the second region. This helps simplify an implementation.

In a possible design, the electronic device further deletes the first window in the window preview region in response to the first operation. This helps improve storage space utilization.

In a possible design, in a landscape state, the display further includes a third region. The third region does not overlap either the first region or the second region, and both the second region and the third region are larger than the first region. This is convenient for the user to view a user interface displayed on the display.

In a possible design, the electronic device detects a second operation, where the second operation is used to hide the window preview region; and hides the window preview region in response to the second operation. This helps the user display or hide the window preview region based on a requirement of the user.

In a possible design, in the landscape state, the electronic device further scales up, based on a preset proportion, the second region and the third region in response to the second operation. This is convenient for the user to view the user interface displayed on the display.

In a possible design, before detecting the first operation performed on the first window, the electronic device detects a third operation performed on the second user interface, where the third operation is used to add a second window to the window preview region, and the second window is a window associated with the second user interface; and adds the second window to the window preview region in response to the third operation. This helps add a corresponding window to the window preview region based on a requirement of the user, to improve user experience.

In a possible design, the third operation is an operation of dragging the first user interface into the window preview region. This helps simplify the implementation.

In a possible design, before displaying the window preview region in the first region of the display, the electronic device detects a fourth operation. The fourth operation is used to display the window preview region.

In a possible design, the first region is located on the left side, right side, upper side, or lower side of the display. In this way, the user views the user interface displayed on the display without being affected by the window preview region.

In a possible design, the first window is a screenshot of the first user interface, a small card obtained after a screenshot of the first user interface is scaled down, or a scaled-down first user interface. This helps simplify the implementation.

According to a second aspect, an embodiment of this application provides a display method. The method includes:

In a landscape state, an electronic device displays a first user interface of a first application in a first region of a display. The display further includes a second region, and the first region does not overlap the second region. The electronic device detects a first operation performed on the first user interface, where the first operation is used to open a second user interface of the first application; and displays the second user interface in the second region of the display in response to the first operation. The electronic device detects a second operation, where the second operation is used to display a window preview region; and in response to the second operation, displays the window preview region in a third region of the display, and scales down the first region to a fourth region and scales down the second region to a fifth region based on a preset proportion. The first user interface is displayed in the fourth region, the second user interface is displayed in the fifth region, and the third region, the fourth region, and the fifth region do not overlap each other. The electronic device detects a third operation performed on the first user interface, where the third operation is an operation of dragging the first user interface into the window preview region; and in response to the third operation, displays a first window in the window preview region and displays a blank in the fourth region of the display. The first window is a window associated with the first user interface. The electronic device detects a fourth operation performed on the first window, where the fourth operation is an operation of dragging the first window into the fifth region; and in response to the fourth operation, displays the first user interface in the fifth region and deletes the first window in the window preview region. The electronic device detects an operation of hiding the window preview region; and in response to the operation of hiding the window preview region, hides the window preview region, and scales up the fourth region to the first region and scales up the fifth region to the second region based on a preset proportion.

In this embodiment of this application, because the window preview region is introduced, a user may perform the first operation on the first window in the window preview region, so that the second user interface displayed on the display is switched to the first user interface associated with the first window. In this way, the user can switch different user interfaces of a same application by only operating once. This helps simplify an operation performed when the user switches the different user interfaces of the same application, and improve user interface switching efficiency. In addition, the user may further display or hide the window preview region based on a requirement of the user, to improve user experience. In addition, the user may further add a window to or delete a window in the window preview region based on a requirement of the user. This helps improve storage space utilization, to further improve user experience.

According to a third aspect, an embodiment of this application provides a device, including one or more processors and a memory. The memory stores program instructions, and when the program instructions are executed by the device, the method according to any one of the foregoing aspects and the possible designs of the foregoing aspects in the embodiments of this application is implemented.

According to a fourth aspect, an embodiment of this application provides a chip. The chip is coupled to a memory in a device, so that when the chip runs, the chip invokes program instructions stored in the memory, to implement the method according to any one of the foregoing aspects and the possible designs of the foregoing aspects in the embodiments of this application.

According to a fifth aspect, an embodiment of this application provides a computer-readable storage medium. The computer-readable storage medium stores program instructions, and when the program instructions are run on an electronic device, the device is enabled to perform the method according to any one of the foregoing aspects and the possible designs of the foregoing aspects in the embodiments of this application.

According to a sixth aspect, an embodiment of this application provides a computer program product. When the computer program product runs on an electronic device, the electronic device is enabled to perform the method according to any one of the foregoing aspects and the possible designs of the foregoing aspects in the embodiments of this application.

In addition, for technical effects brought by any possible design in the third aspect to the sixth aspect, refer to technical effects brought by different designs in the method part. Details are not described herein again.

DETAILED DESCRIPTION OF ILLUSTRATIVE EMBODIMENTS

It should be understood that, "/" means "or" unless otherwise specified in this application. For example, A/B may represent A or B. "And/or" in this application is merely an association for describing associated objects, and represents that three relationships may exist. For example, A and/or B may represent the following three cases: Only A exists, both A and B exist, and only B exists. "At least one" means one or more, and "a plurality of" means two or more.

In this application, "example", "in some embodiments", "in some other embodiments", or the like is used to represent giving an example, an illustration, or a description. Any embodiment or design scheme described as an "example" in this application should not be explained as being more preferred or having more advantages than another embodiment or design scheme. Exactly, the term "example" is used to present a concept in a specific manner.

In addition, terms such as "first" and "second" in this application are merely used for distinction and description, and cannot be understood as an indication or implication of relative importance or implicit indication of a quantity of indicated technical features, or an indication or implication of a sequence.

When a user uses an electronic device, the electronic device may be in a landscape state or in a portrait state. In the landscape state, a display of the electronic device is basically in a shape of a horizontal bar. In the portrait state, the display of the electronic device is basically in a shape of a vertical bar. Specifically, in the landscape state and the portrait state, aspect ratios of the display of the electronic device are different. The aspect ratio of the display may also be referred to as a height-width ratio of the display, and is a ratio of a height to a width of the display. In the landscape state, the height of the display is a length of a short side of the display, and the width of the display is a length of a long side of the display. In the portrait state, the height of the display is the length of the long side of the display, and the width of the display is the length of the short side of the display. The long sides of the display are two longer sides that are parallel and equal to each other in the four sides of the display, and the short sides of the display are two shorter sides that are parallel and equal to each other in the four sides of the display.

Figure 1:
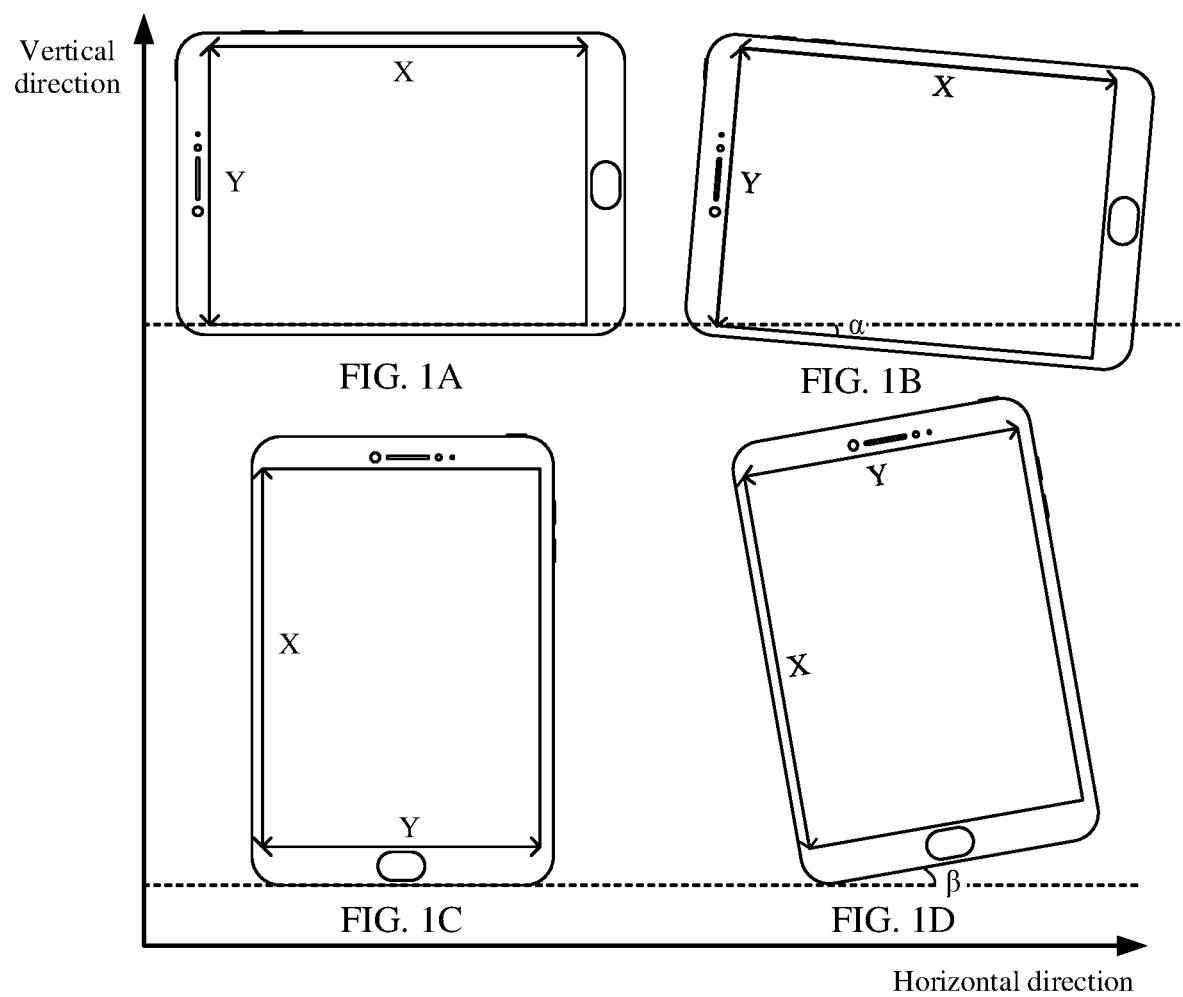
FIG. 1A to FIG. 1D are schematic diagrams of a landscape state and a portrait state of an electronic device according to an embodiment of this application.

For example, when the electronic device is in a landscape state shown in FIG. 1A, the height of the display is Y, and the width of the display is X. In this case, the aspect ratio of the display is Y/X, where Y/X<1. It should be noted that, when the electronic device is tilted or rotated by a relatively small angle in the landscape state shown in FIG. 1A (for example, the angle is not greater than a first preset threshold, for example, 20°, 15°, or 5°), the electronic device is still considered to be in the landscape state. For example, in the landscape state shown in FIG. 1A, the electronic device rotates clockwise at an angle α, so that the electronic device is in a state shown in FIG. 1B. When α is not greater than the first preset threshold, the electronic device considers the state shown in FIG. 1B as the landscape state. For another example, when the electronic device is a portrait state shown in FIG. 1C, the height of the display is X, and the width of the display is Y. In this case, the aspect ratio of the display is X/Y, where X/Y>1. It should further be noted that, when the electronic device is tilted or rotated by a relatively small angle in the portrait state shown in FIG. 1C (for example, the angle is not greater than a second preset threshold, for example, 20°, 15°, or 5°), the electronic device is still considered to be in the portrait state. For example, in the portrait state shown in FIG. 1C, the electronic device rotates counterclockwise at an angle β, so that the electronic device is in a state shown in FIG. 1D. When β is not greater than the second preset threshold, the electronic device considers the state shown in FIG. 1D as the portrait state. It may be understood that the first preset threshold and the second preset threshold may be the same or different, and may be set based on an actual requirement. This is not limited.

When a difference between a display configuration of an application and the aspect ratio of the display is relatively small, the electronic device can normally display a user interface of the application on the display. However, in the landscape state of the electronic device, the aspect ratio of the display is usually greatly different from the display configuration of the application. Therefore, to enable the electronic device in the landscape state to normally display the user interface of the application, in the landscape state, the display of the electronic device may be divided into a plurality of regions whose aspect ratios match the display configuration of the application. Differences between display configurations of most applications and the aspect ratio of the display are relatively small when the electronic device is in the portrait state, and the aspect ratio of the display is usually a conventional proportion when the electronic device is in the portrait state, for example, 16:9, 18:9, 20:9, or 16:10. Therefore, in the landscape state, the display of the electronic device may be divided into a plurality of regions whose aspect ratios are the conventional proportion, so that the electronic device can normally display the user interface of the application in the landscape state.

An application may include user interfaces at different levels, and the application may also include a plurality of user interfaces at a same level. However, currently, regardless of whether the electronic device is in the landscape state or the portrait state, when the user switches user interfaces at a same level or user interfaces at two or more levels of a same application, the user needs to operate the electronic device at least twice. This is complex and affects user experience.

In view of this, an embodiment of this application provides a display method, so that an electronic device can display a window preview region. The window preview region may include a window associated with at least one historically browsed user interface in an application, so that a user can perform, based on a requirement of the user, an operation on the window included in the window preview region. In this way, a user interface displayed on a display may be directly switched to the user interface, associated with the window, of the application. Compared with the conventional technology, the display method simplifies a user operation during interface switching, improves interface switching efficiency, and helps improve user experience.

The following describes the electronic device and embodiments for using the electronic device. The electronic device in the embodiments of this application may be a tablet computer, a mobile phone, a vehicle-mounted device, an augmented reality (augmented reality, AR)/virtual reality (virtual reality, VR) device, a notebook computer, or an ultra-mobile personal computer (ultra-mobile personal computer, UMPC), a netbook, a personal digital assistant (personal digital assistant, PDA), a wearable device, or the like. A specific type of the electronic device is not limited in the embodiments of this application.

Figure 2:
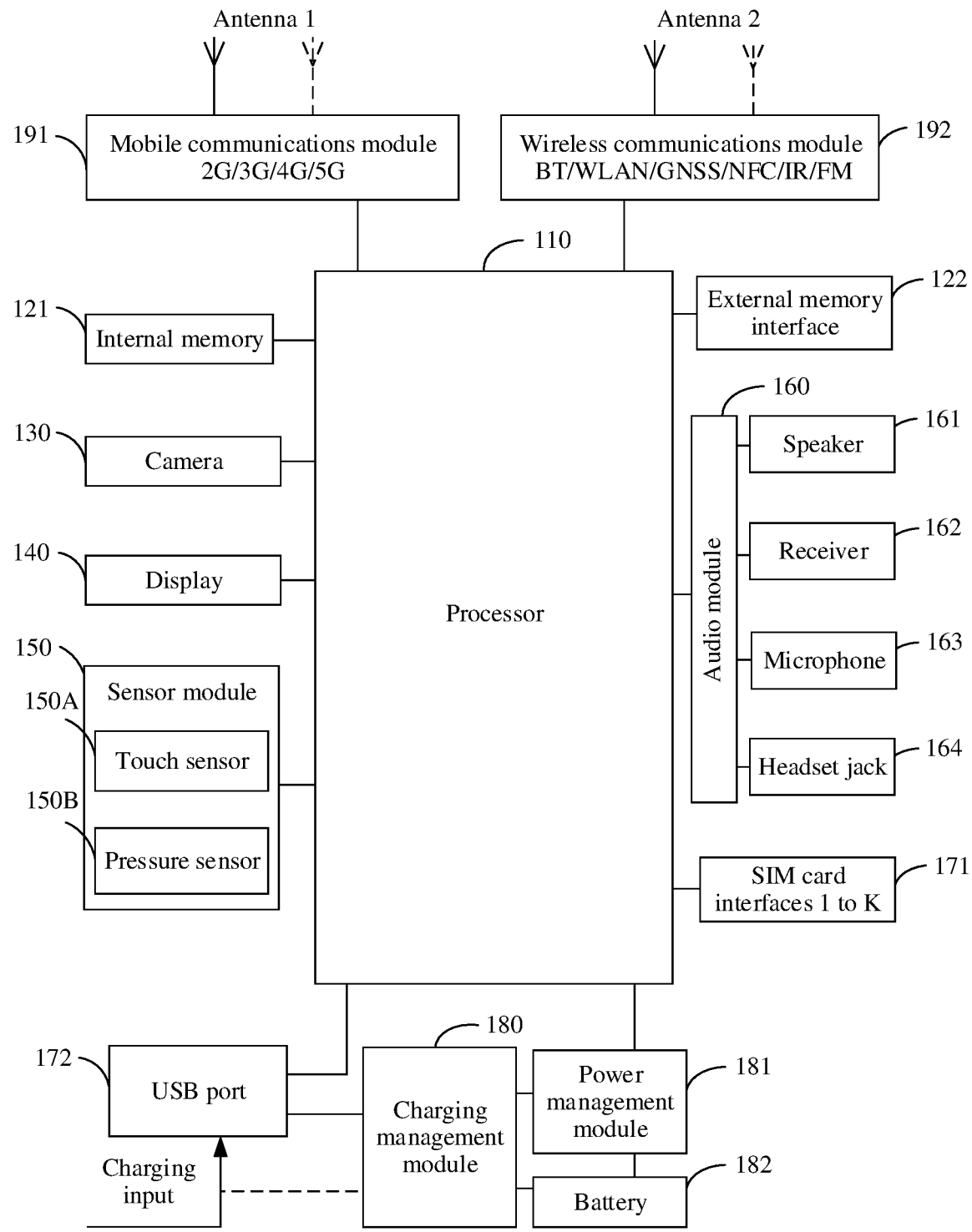
FIG. 2 is a schematic diagram of a hardware architecture of an electronic device according to an embodiment of this application.

For example, FIG. 2 is a schematic diagram of a hardware structure of the electronic device according to an embodiment of this application. As shown in FIG. 2, the electronic device includes a processor 110, an internal memory 121, an external memory interface 122, a camera 130, a display 140, a sensor module 150, an audio module 160, a speaker 161, a receiver 162, a microphone 163, a headset jack 164, and a subscriber identification module (subscriber identification module, SIM) card interface 171, a universal serial bus (universal serial bus, USB) interface 172, a charging management module 180, a power management module 181, a battery 182, a mobile communications module 191, and a wireless communications module 192. In addition, in some other embodiments, the electronic device may further include a motor, an indicator, a button, and the like.

It should be understood that the hardware structure shown in FIG. 2 is merely an example. The electronic device in this embodiment of this application may have more or fewer components than those of the electronic device shown in the figure, two or more components may be combined, or there may be a different component configuration. Various components shown in the figure may be implemented in hardware that includes one or more signal processing and/or application-specific integrated circuits, software, or a combination of hardware and software.

The processor 110 may include one or more processing units. For example, the processor 110 may include an application processor (application processor, AP), a modem, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). In a specific implementation, different processing units may be independent components, or may be integrated into one or more processors.

In some embodiments, a buffer may further be disposed in the processor 110, and is configured to store a program and/or data. For example, the buffer in the processor 110 may be a cache. The buffer may be configured to store a program and/or data that are/is just used, generated, or cyclically used by the processor 110. If the processor 110 needs to use the program and/or the data, the processor 110 may directly invoke the program and/or the data from the cache. This helps reduce a time for the processor 110 to obtain the program or the data, thereby helping improve system efficiency.

The internal memory 121 may be configured to store a program (or program instructions) and/or data. In some embodiments, the internal memory 121 includes a program storage region and a data storage region. The program storage region may be configured to store an operating system (for example, Android, iOS, or another operating system), a program required by at least one function (for example, a facial recognition function, a sound playing function, or an interface display function), and the like. The data storage region may be configured to store data (for example, audio data, an image, at least one historically browsed user interface, and at least one window associated with the user interface) created and/or collected in a process of using the electronic device, and the like. For example, the processor 110 may invoke the program and/or the data stored in the internal memory 121, so that the electronic device is enabled to perform a corresponding method, to implement one or more functions. For example, the processor 110 invokes some programs and/or data in the internal memory, so that the electronic device is enabled to perform the display method provided in the embodiments of this application, to help implement fast interface switching and improve user experience. The internal memory 121 may be a high-speed random access memory, a non-volatile memory, and/or the like. For example, the non-volatile memory may include at least one of one or more magnetic disk storage components, a flash component and/or a universal flash storage (universal flash storage, UFS).

The external memory interface 122 may be configured to connect to an external storage card (for example, a micro SD card), to extend a storage capability of the electronic device. The external storage card communicates with the processor 110 through the external memory interface 122, to implement a data storage function. For example, the electronic device may store a file such as an image, music, or a video in the external memory card through the external memory interface 122.

The camera 130 may be configured to capture dynamic and static images and the like. Usually, the camera 130 includes a lens and an image sensor. An optical image generated by an object through the lens is projected onto the image sensor, and then converted into an electrical signal for subsequent processing. For example, the image sensor may be a charge-coupled device (charge coupled device, CCD) or a complementary metal-oxide-semiconductor (complementary metal-oxide-semiconductor, CMOS) phototransistor. The image sensor converts an optical signal into an electrical signal, and then transmits the electrical signal to the ISP, to convert the electrical signal into a digital image signal. It should be noted that, in this embodiment of this application, the electronic device may include one or more cameras 130. This is not limited. For example, the electronic device includes five cameras 130, for example, three rear-facing cameras and two front-facing cameras. For another example, the electronic device includes three cameras 130, for example, two rear-facing cameras and one front-facing camera.

Figure 3B:
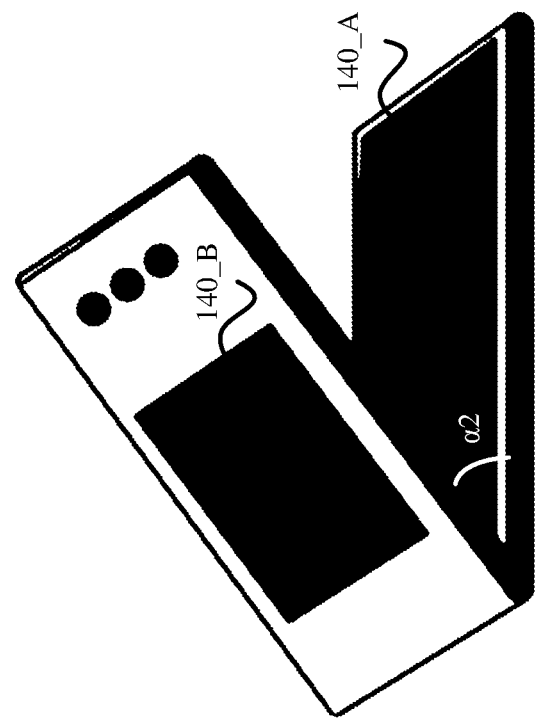
FIG. 3A and FIG. 3B are schematic diagrams of an electronic device according to an embodiment of this application.
Figure 3A:
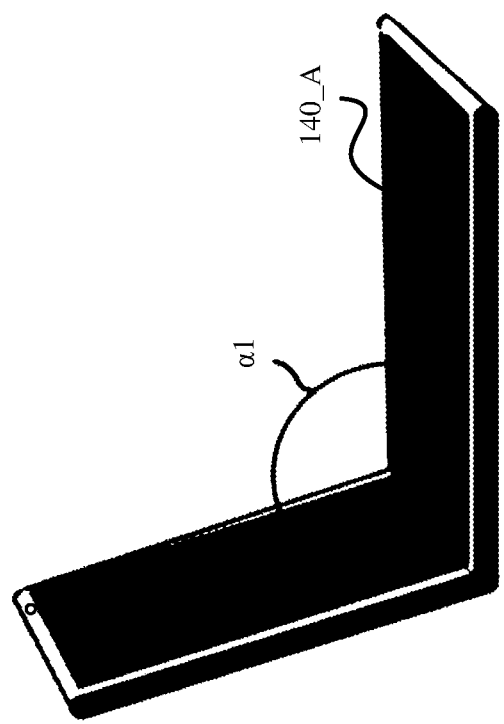
Figure 4:
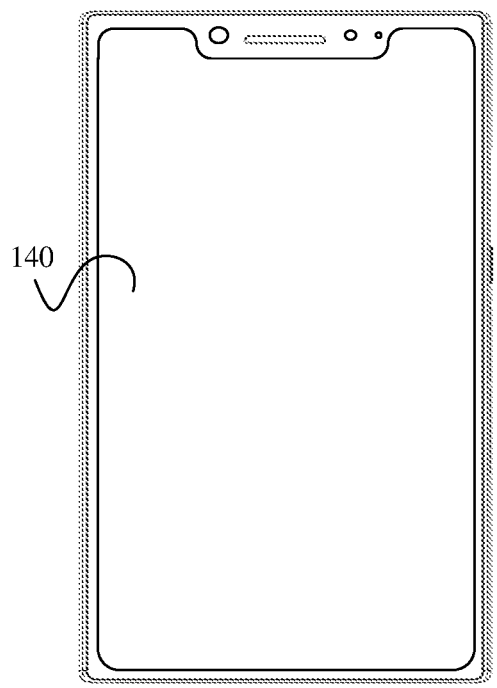
FIG. 4 is a schematic diagram of another electronic device according to an embodiment of this application.

The display 140 may include a display panel. A user may enable the display 140 to display different user interfaces based on a requirement of the user, to meet the requirement of the user. Specifically, the display panel may be a liquid crystal display (liquid crystal display, LCD), an organic light-emitting diode (organic light-emitting diode, OLED), an active-matrix organic light-emitting diode or an active-matrix organic light-emitting diode (active-matrix organic light emitting diode, AMOLED), a flexible light-emitting diode (flex light-emitting diode, FLED), a mini-LED, a micro-LED, a micro-OLED, quantum dot light emitting diodes (quantum dot light emitting diodes, QLED), or the like. For example, the electronic device may implement a display function by using the GPU, the display 140, the application processor, and the like. It should be noted that the display 140 may be a foldable screen or a non-foldable screen. This is not limited. It should further be noted that, in this embodiment of this application, the electronic device may include one or more displays 140. This is not limited. For example, the electronic device includes two displays 140. For example, as shown in FIG. 3A and FIG. 3B, the electronic device includes a foldable display 140_A and a non-foldable display 140_B. As shown in FIG. 3A, an included angle of the foldable display 140_A is α1, and as shown in FIG. 3B, the included angle of the foldable display 140_A is α2. It may be understood that the included angle of the foldable display 140_A may be within a range of [0°, 180°]. When the included angle of the foldable display 140_A is 0°, the foldable display 140_A is in a closed state, and when the included angle of the foldable 140_A is 180°, the foldable 140_A is in an unfolded state. For another example, the electronic device includes one display 140. For example, as shown in FIG. 4, the electronic device includes the display 140.

The sensor module 150 may include one or more sensors, for example, a touch sensor 150A and a pressure sensor 150B. In some other embodiments, the sensor module 150 may further include one or more of a gyroscope, an acceleration sensor, a fingerprint sensor, an ambient light sensor, a distance sensor, an optical proximity sensor, a bone conduction sensor, a temperature sensor, and the like. This is not limited.

The touch sensor 150A may also be referred to as a "touch panel". The touch sensor 150A may be disposed on the display 140. When the touch sensor 150A is disposed on the display 140, the touch sensor 150A and the display 140 form a touchscreen, which is also referred to as a "touch screen". The touch sensor 150A is configured to detect a touch operation performed on or near the touch sensor 150A. The touch sensor 150A may transfer the detected touch operation to the application processor, to determine a type of a touch event. The electronic device may provide, by using the display 140, a visual output related to the touch operation, and the like. For example, the electronic device may perform interface switching in response to the touch operation that is performed on or near the touch sensor 150A and that is detected by the touch sensor 150A, and display a switched user interface after switching on the display 140. In some other embodiments, the touch sensor 150A may alternatively be disposed on a surface of the electronic device at a location different from that of the display 140.

The pressure sensor 150B is configured to sense a pressure signal, and may convert the pressure signal into an electrical signal. For example, the pressure sensor 150B may be disposed on the display 140. Touch operations that are performed at a same touch location but have different touch operation intensity may correspond to different operation instructions.

The electronic device may implement an audio function, for example, an audio playing function, a recording function, or a voice wakeup function, by using the audio module 160, the speaker 161, the receiver 162, the microphone 163, the headset jack 164, the application processor, and the like.

The audio module 160 may be configured to perform digital-to-analog conversion and/or analog-to-digital conversion on audio data, and may further be configured to encode and/or decode the audio data. For example, the audio module 160 may be disposed in the processor 110, or some function modules of the audio module 160 are disposed in the processor 110.

The speaker 161, also referred to as a "loudspeaker", is configured to convert audio data into a sound, and play the sound. For example, the electronic device 100 may be configured to listen to music, answer a call in hands-free mode, or give a voice prompt by using the speaker 161.

The receiver 162, also referred to as an "earpiece", is configured to convert audio data into a sound, and play the sound. For example, when a call is answered by using the electronic device, the receiver 162 may be put close to a human ear to answer the call.

The microphone 163, also referred to as a "mike" or "mic", is configured to collect a sound (for example, an ambient sound, including a sound made by a person or a sound made by a device), and convert the sound into audio electrical data. When making a call or sending a voice, the user may make a sound near to the microphone 163 through the mouth of the user, and the microphone 163 collects the sound made by the user. It should be noted that at least one microphone 163 may be disposed in the electronic device. For example, two microphones 163 are disposed in the electronic device, to implement a noise reduction function in addition to sound collection. For another example, three, four, or more microphones 163 may alternatively be disposed in the electronic device, to implement a sound source identification or directional recording function or the like when implementing sound collection and noise reduction.

The headset jack 164 is configured to connect to a wired headset. The headset jack 164 may be a USB port 170, a 3.5 mm open mobile electronic device platform (open mobile terminal platform, OMTP) standard interface, a cellular telecommunications industry association of the USA (cellular telecommunications industry association of the USA, CTIA) standard interface, or the like.

The SIM card interface 171 is configured to connect to a SIM card. The SIM card may be inserted into the SIM card interface 171 or removed from the SIM card interface 171, to implement contact with or separation from the electronic device. The electronic device may support one or K SIM card interfaces 171, where K is a positive integer greater than 1. The SIM card interface 171 may support a nano-SIM card, a micro-SIM card, a SIM card, and/or the like. A plurality of SIM cards may be simultaneously inserted into a same SIM card interface 171. The plurality of SIM cards may be of a same type or different types. The SIM card interface 171 may also be compatible with different types of SIM cards. The SIM card interface 171 may also be compatible with an external storage card. The electronic device interacts with a network by using the SIM card, to implement functions such as calling and data communication. In some embodiments, the electronic device may further use an eSIM, namely, an embedded SIM card. The eSIM card may be embedded into the electronic device, and cannot be separated from the electronic device.

The USB port 172 is an interface that conforms to a USB standard specification, and may be specifically a mini USB port, a micro USB port, a USB type-C port, or the like. The USB port 172 may be configured to connect to a charger to charge the electronic device, may be configured to transmit data between the electronic device and a peripheral device, or may be configured to connect to a headset for playing a sound through the headset. For example, in addition to the headset jack 164, the USB port 172 may further be configured to connect to another electronic device, for example, an AR device or a computer.

The charging management module 180 is configured to receive a charging input from the charger. The charger may be a wireless charger or a wired charger. In some embodiments of wired charging, the charging management module 180 may receive a charging input from the wired charger through the USB port 170. In some embodiments of wireless charging, the charging management module 180 may receive a wireless charging input through a wireless charging coil of the electronic device. When charging the battery 182, the charging management module 180 may further supply power to the electronic device by using the power management module 180.

The power management module 181 is configured to connect the battery 182, the charging management module 180, and the processor 110. The power management module 181 receives an input from the battery 182 and/or an input from the charging management module 180, and supplies power to the processor 110, the internal memory 121, the camera 130, the display 140, and the like. The power management module 181 may further be configured to monitor parameters such as a battery capacity, a quantity of battery cycles, and a battery health status (electrical leakage and impedance). In some other embodiments, the power management module 181 may alternatively be disposed in the processor 110. In some other embodiments, the power management module 181 and the charging management module 180 may alternatively be disposed in a same component.

The mobile communications module 191 may provide a solution that is applied to the electronic device and that includes wireless communication such as 2G, 3G, 4G, or 5G. The mobile communications module 191 may include a filter, a switch, a power amplifier, a low noise amplifier (low noise amplifier, LNA), and the like.

The wireless communications module 192 may provide a solution that is applied to the electronic device and that includes wireless communication such as a WLAN (for example, a Wi-Fi network), Bluetooth (Bluetooth, BT), a global navigation satellite system (global navigation satellite system, GNSS), frequency modulation (frequency modulation, FM), a near field communication (near field communication, NFC) technology, and an infrared (infrared, IR) technology. The wireless communications module 192 may be one or more components integrating at least one communications processing module.

In some embodiments, an antenna 1 of the electronic device is coupled to the mobile communications module 191, and an antenna 2 is coupled to the wireless communications module 192, so that the terminal device can communicate with another device. Specifically, the mobile communications module 191 may communicate with another device through the antenna 1, and the wireless communications module 192 may communicate with another device through the antenna 2.

An example in which the electronic device is a tablet computer is used below to describe the display method in the embodiments of this application with reference to the accompanying drawings of the specification. For ease of description, the tablet computer is referred to as a tablet in the following.

Figure 5A:
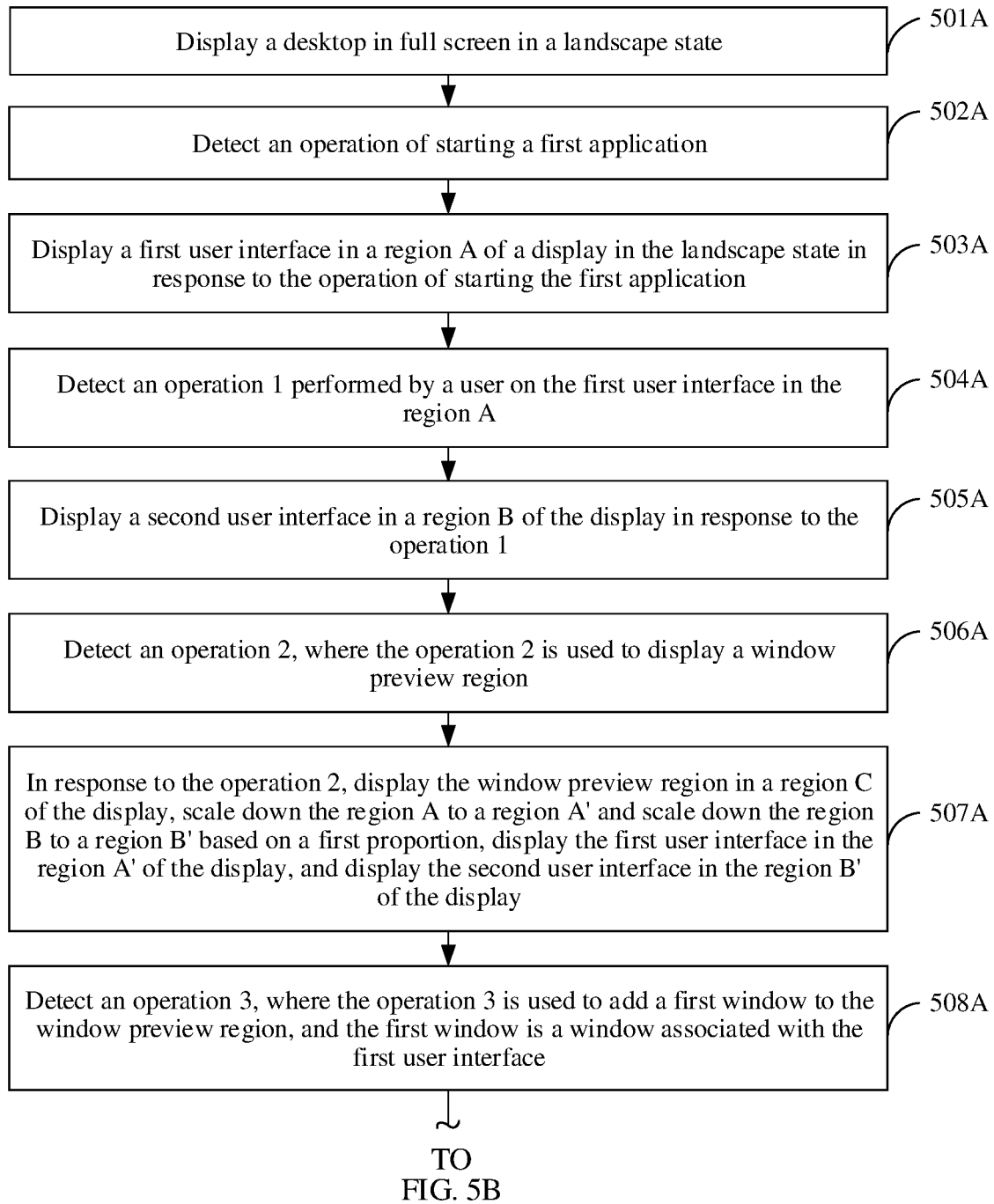
FIG. 5A and FIG. 5B are a schematic flowchart of a display method according to an embodiment of this application.
Figure 5B:
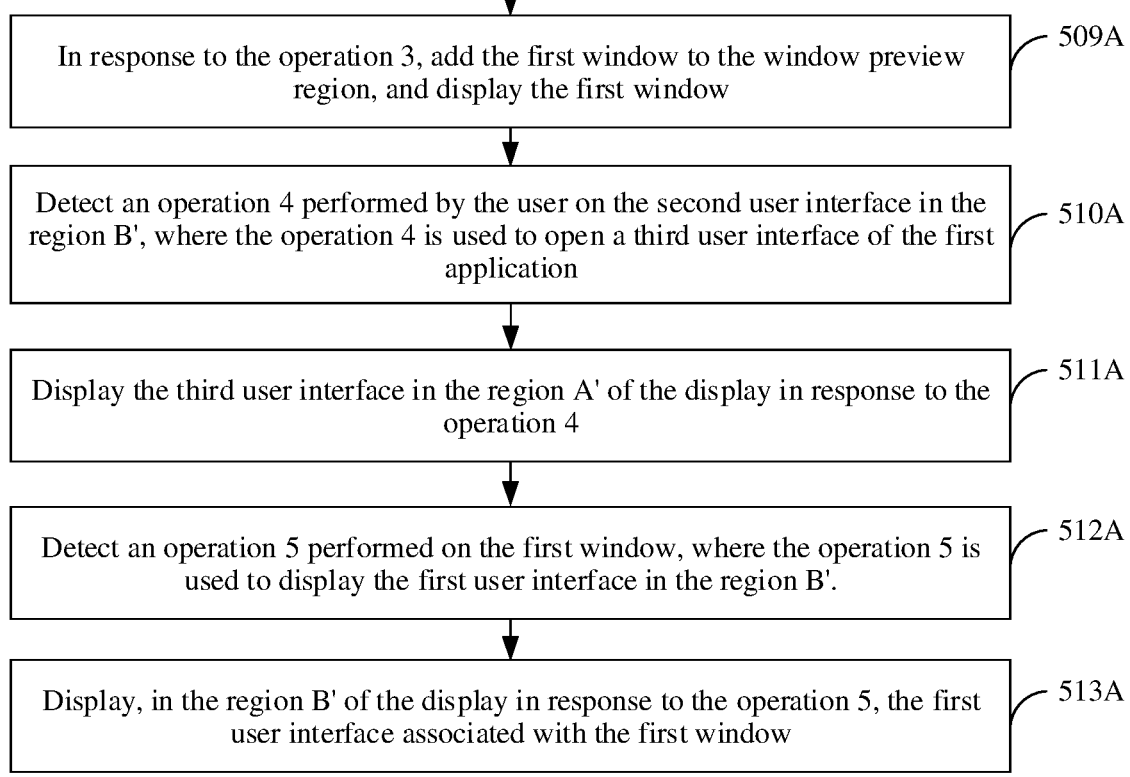

For example, FIG. 5A and FIG. 5B are a schematic flowchart of a display method according to an embodiment of this application. The display method specifically includes the following steps.

Step 501A: A tablet displays a desktop in full screen on a display in a landscape state.

Figure 6:
FIG. 6 is a schematic diagram of a desktop according to an embodiment of this application.

In this embodiment of this application, the desktop may also be referred to as a home screen, and may include icons of one or more applications. For example, the desktop may be a user interface 600 shown in FIG. 6. As shown in FIG. 6, the user interface 600 includes icons of a plurality of applications, such as an icon 601 of WeChat, an icon 602 of Toutiao, an icon 603 of Microblog, and an icon 604 of Taobao. In some embodiments, the user interface 600 further includes a status bar 605, and a time and weather widget (widget). The status bar 605 may include time, signal strength (for example, a Wi-Fi icon), a current remaining battery level, and the like. In addition, it may be understood that, in some other embodiments, the status bar 605 may further include a Bluetooth icon, a clock icon, an external device icon, a notification icon, or the like. It may further be understood that, in some other embodiments, the user interface 600 may further include a Dock bar, and the Dock bar may include an icon of a frequently used application, for example, an icon of Phone or an icon of Messaging. It should be noted that the icon of the application included in the Dock bar may be correspondingly set based on a requirement of a user.

Step 502A: The tablet detects an operation of starting a first application.

For example, the operation of starting the first application may be a gesture operation, a voice operation, or another operation. This is not limited. For example, the gesture operation may be a touch gesture operation or a floating gesture operation. The touch gesture operation may be a tapping operation, a double tapping operation, a pressing and holding operation, a heavy pressing operation (to be specific, press force is large), or the like. It should be noted that, in step 501A, the desktop displayed by the tablet may include an icon of the first application, or may not include an icon of the first application. This is not limited.

For example, the first application is Taobao (a shopping application). An operation of starting Taobao may be an operation of tapping the icon of Taobao on the desktop by the user, an operation of starting Taobao by the user through a voice indication, a shortcut gesture operation performed by the user on the desktop, or the like. For example, the desktop displayed by the tablet on the display in the landscape state is the user interface 600 shown in FIG. 6. The operation of starting Taobao may be an operation of tapping the icon 604 by the user. For another example, the first application is Jingdong (another shopping application). An operation of starting Jingdong may be an operation of tapping an icon of Jingdong on the desktop by the user, an operation of starting Taobao by the user through a voice indication, a shortcut gesture operation performed by the user on the desktop, or the like. For example, the desktop displayed by the tablet in the landscape state is the user interface 600 shown in FIG. 6. Because the user interface 600 does not include the icon of Jingdong, the operation of starting Jingdong may be the operation of starting Jingdong through the voice indication, the shortcut gesture operation performed on the user interface 600, or the like.

Step 503A: The tablet displays, in the landscape state, a first user interface in a region A of the display in response to the operation of starting the first application.

For example, the first user interface may be a home page of the first application, or, in the landscape state, a page that is last displayed in the region A of the display when the first application run in the foreground is most recently exited. In some embodiments, in response to the operation of starting the first application, the tablet displays, in the region A of the display or in full screen, an advertisement page pushed by the first application, and then displays the first user interface in the region A of the display. For example, after duration for displaying, on the display, the advertisement page pushed by the first application reaches preset duration, the tablet stops displaying the advertisement page, and then displays the first user interface in the region A of the display. For example, the preset duration may be 5 s, 15 s, or 20 s. This is not limited. Alternatively, when displaying, on the display, the advertisement page pushed by the first application, the tablet receives an operation that is indicated by the user to skip the advertisement page, the tablet stops displaying the advertisement page in response to the operation that is indicated by the user to skip the advertisement page, and then displays the first user interface in the region A of the display.

In some embodiments, in response to the operation of starting the first application, the tablet displays the first user interface in the region A of the display, and does not display the first user interface in a region B of the display. The region A and the region B do not overlap each other. For example, the tablet may display a pattern (for example, a wallpaper pattern) or a desktop background in the region B of the display, that is, content on a desktop displayed in a range of the region B of the display. Alternatively, the tablet displays a blank in the region B of the display.

Figure 7A:
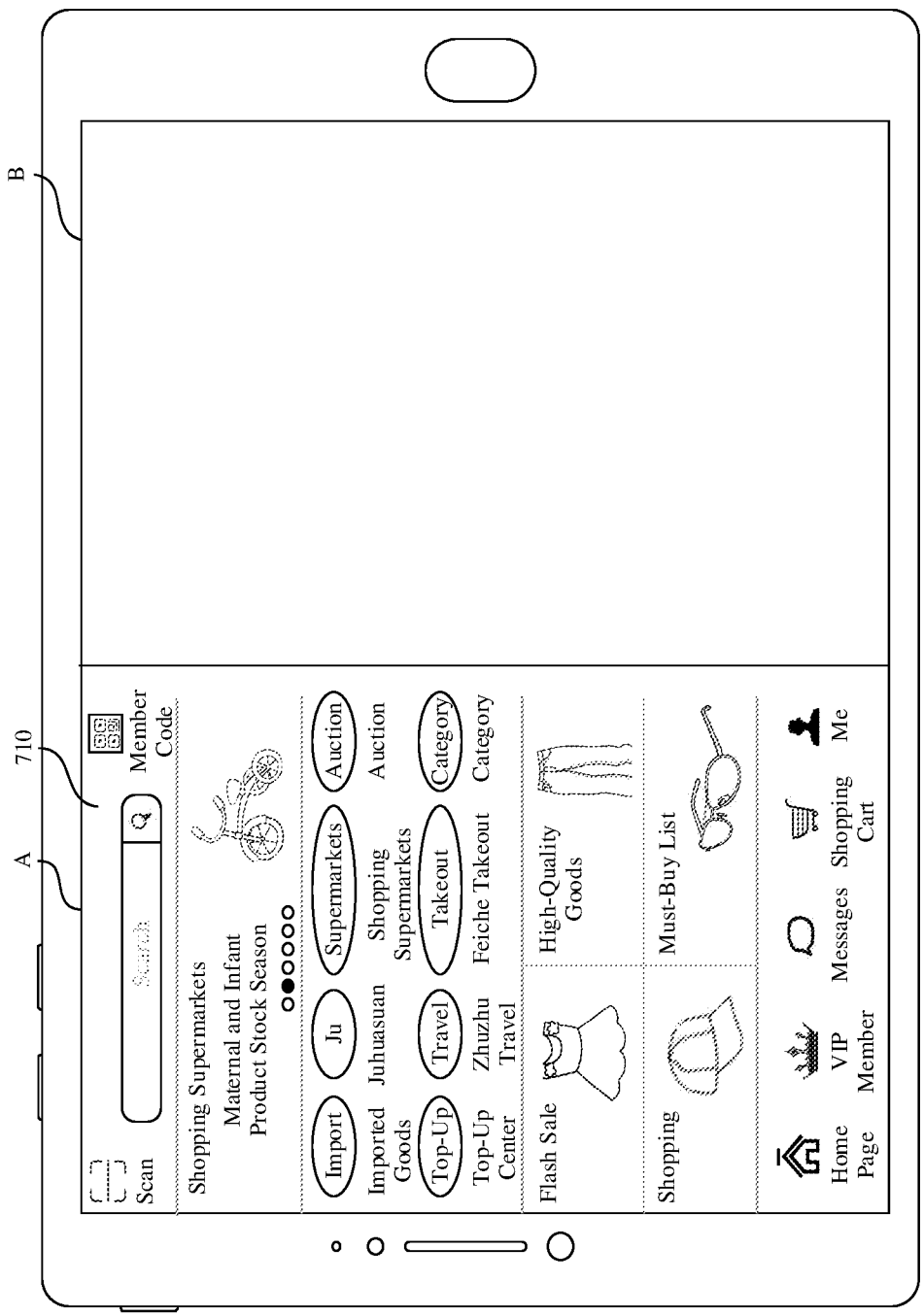
FIG. 7A is a schematic diagram of a user interface displayed by an electronic device in a landscape state according to an embodiment of this application.

For example, in response to tapping the icon 604 on the user interface 600 shown in FIG. 6, the tablet displays a home page 710 of Taobao in the region A of the display shown in FIG. 7A, and displays the blank in the region B of the display shown in FIG. 7A.

In some embodiments, the user may further perform an operation on the first user interface displayed in the region A of the display, to display the first user interface in the region B of the display. For example, in response to an operation of dragging, by the user, the first user interface displayed in the region A, the tablet may drag the first user interface from the region A to the region B for display. In some other embodiments, after the user drags the first user interface from the region A to the region B for display, a blank, a desktop background, a pattern, or the like is displayed in the region A of the display.

Step 504A: The tablet detects an operation 1 performed by the user on the first user interface in the region A, where the operation 1 is used to open a second user interface of the first application.

The operation 1 may be a gesture operation performed by the user on the first user interface in the region A. For example, the first user interface is the home page 710 of Taobao shown in FIG. 7A. The operation 1 may be an operation of tapping an option (for example, an "auction" option or a "must-buy list" option) on the home page 710 of Taobao by the user. The operation 1 may alternatively be an operation of entering a corresponding search keyword (for example, hat) in a search box and taping a search option.

Step 505A: The tablet displays the second user interface in the region B of the display in response to the operation 1. For example, the tablet continues to display the first user interface in the region A of the display. Content on the first user interface basically remains unchanged. Alternatively, a content display effect of the first user interface changes. For example, the first user interface is the home page 710 of Taobao shown in FIG. 7B. For example, the operation 1 is tapping an option such as "auction" or "must-buy list" by the user. In this case, one or more of a color, brightness, contrast, a grayscale, a display form, or the like of content of the option tapped by the user on the home page 710 of Taobao changes, to indicate that the option is currently opened or has been opened. For another example, the operation 1 is entering the search keyword (for example, hat) in the search box and tapping the search option by the user. In this case, the search box on the home page 710 of Taobao may include the search keyword "hat", to indicate that the user has searched for a hat.

In some embodiments, in the landscape state, the user may drag the first user interface into the region B for display by performing an operation on the first user interface, or the user may drag the second user interface into the region A for display by performing an operation on the second user interface. For example, the user drags the first user interface into the region E for display by performing an operation on the first user interface. The operation performed by the user on the first user interface may be a dragging operation, a sliding operation, or the like performed by the user from the region A to the region B. After the user drags the first user interface into the region B for display, a blank, a desktop background, a pattern, or the like may be displayed in the region A, and the first user interface may cover the second user interface and be displayed in the region B, or the first user interface may replace the second user interface and be displayed in the region B.

Step 506A: The tablet detects an operation 2. The operation 2 is used to display a window preview region.

For example, the operation 2 may be a gesture operation, a voice operation, or another operation. This is not limited. For example, the gesture operation may be a touching and holding operation or a heavy pressing operation in the region A and/or the region B, or another gesture operation, for example, a sliding operation on a boundary (for example, the left boundary) of the display.

Step 507A: In response to the operation 2, the tablet displays the window preview region in a region C of the display, scales down the region A to a region D and scales down the region B to a region E based on a first proportion, displays the first user interface in the region D of the display, and displays the second user interface in the region E of the display. For example, an area of the region C is less than an area of the region D and an area of the region E, and an area of the region D may be equal or unequal to the area of the region E. This is not limited.

The region C, the region D, and the region E do not overlap each other. For example, in response to the operation 2, the tablet may further adaptively adjust, based on the first proportion, a size of the first user interface displayed in the region A, so that the first user interface can be normally displayed in the region D; and adaptively adjust a size of the second user interface based on the first proportion, so that the second user interface can be normally displayed in the region E.

It should be noted that the first proportion may be a default proportion in a system, or may be set based on a user requirement of the user, and is related to the area of the region C. Specifically, a larger area of the region C indicates a larger first proportion, and a smaller area of the region C indicates a smaller first proportion. For example, the area of the region C may be set based on a requirement of the user, and the tablet may determine the first proportion based on the area of the region C that is set by the user. For another example, the user may set the first proportion, and the tablet may determine the area of the region C based on the first proportion set by the user. For example, the area of the region C and the first proportion may alternatively be preset before delivery of the tablet.

Figure 7B:
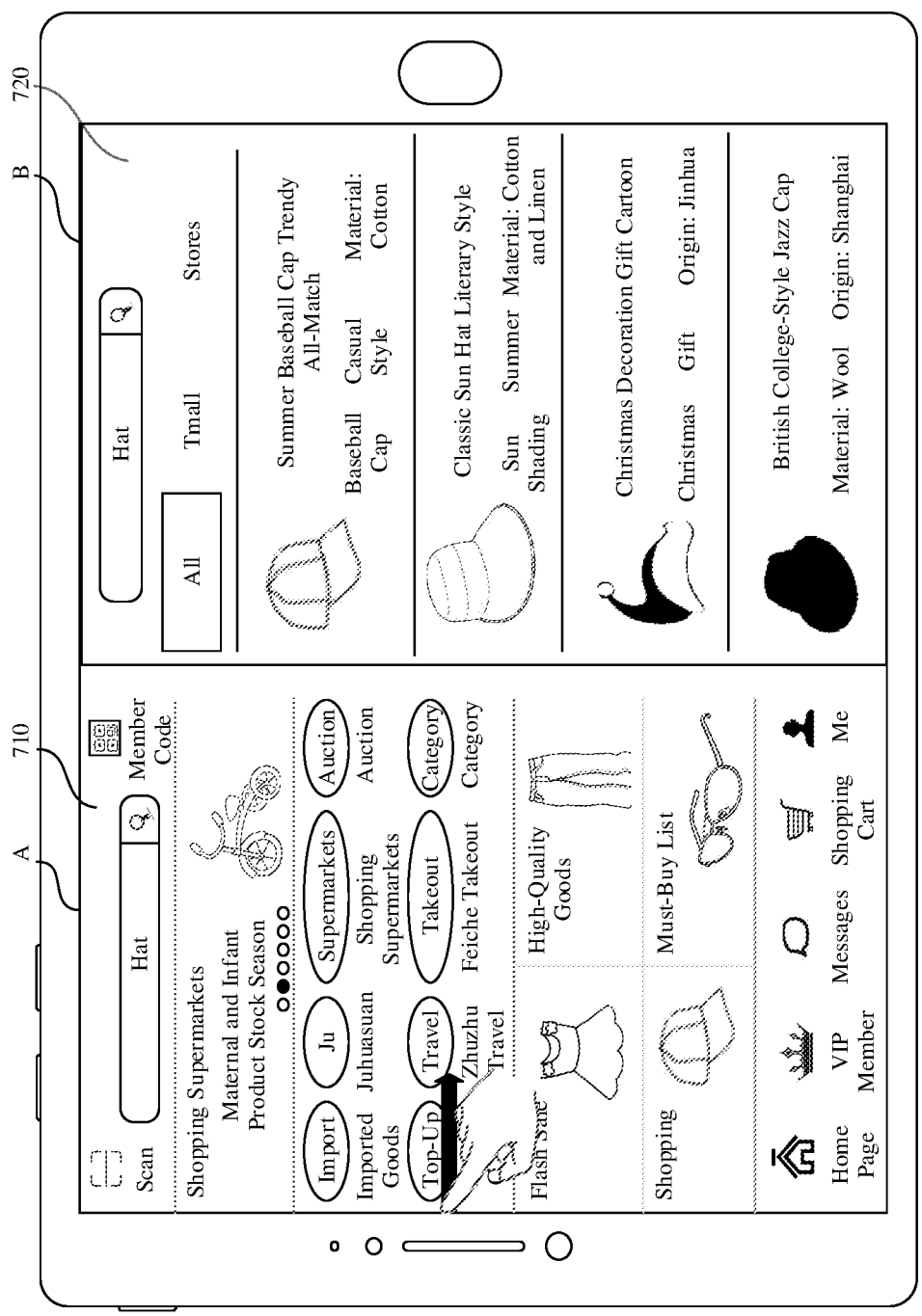
FIG. 7B is a schematic diagram of another user interface displayed by an electronic device in a landscape state according to an embodiment of this application.
Figure 7C:
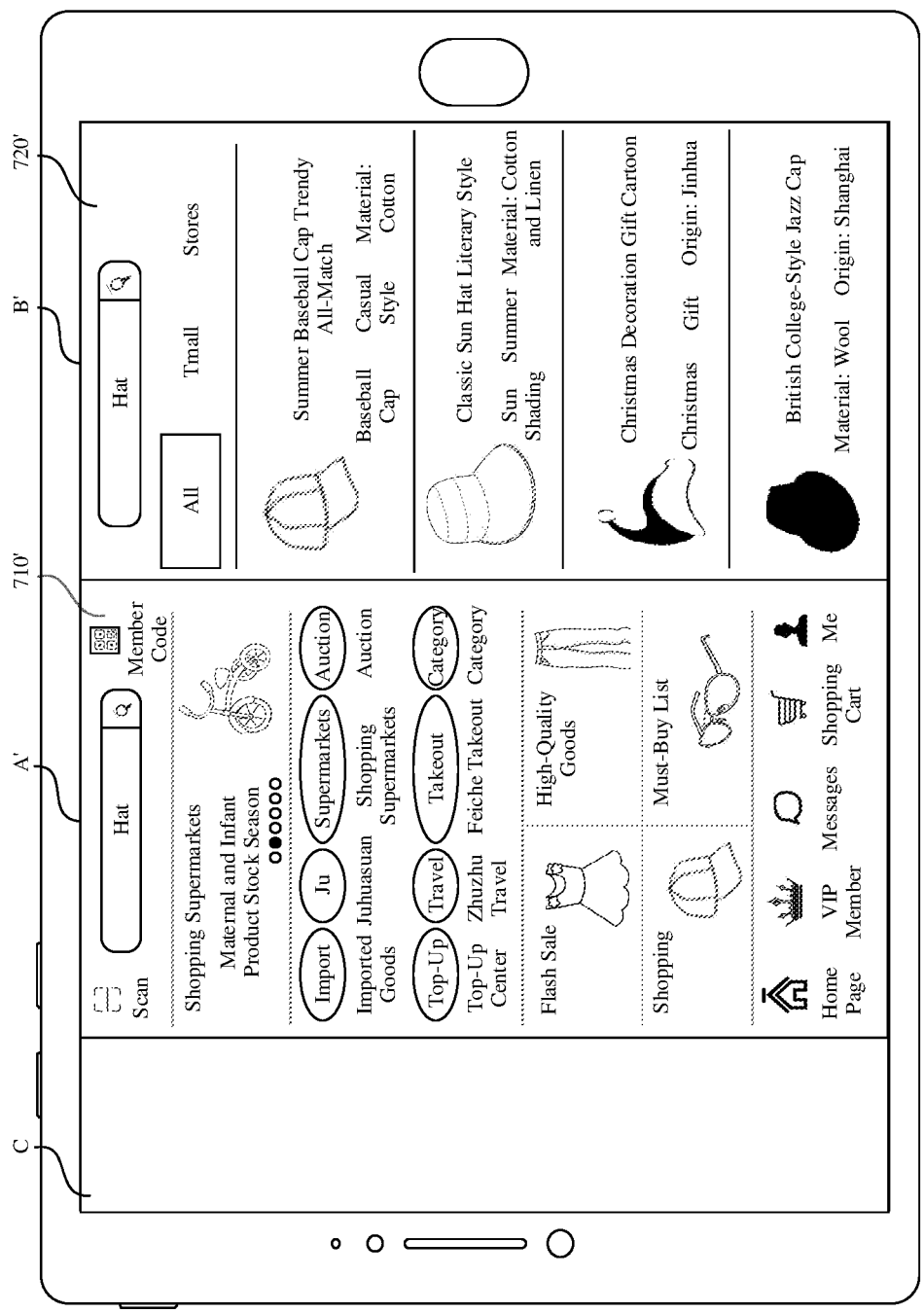
FIG. 7C is a schematic diagram of another user interface displayed by an electronic device in a landscape state according to an embodiment of this application.

In some embodiments, a location of the region C used to display the window preview region may also be a default location in the system, or may be preconfigured before the delivery of the tablet. This is not limited. For example, the location, configured before the delivery of the tablet, of the region C used to display the preview region is the left side of the display. As shown in FIG. 7B, in the landscape state, the tablet displays the home page 710 of Taobao in the region A of the display, and displays a page 720 of hat search result details in the region B of the display. Based on the scenario shown in FIG. 7B, the tablet detects a second operation, and in response to the second operation, as shown in FIG. 7C, displays the window preview region in the region C of the display, scales down the region A to a region D' and scales down the region B to a region E' based on the first proportion, displays a home page 710' of Taobao in the region D' of the display, and displays a page 720' of the hat search result details in the region E' of the display. For example, the operation 2 may be an operation of pressing the left boundary of the display and sliding rightward.

Figure 8:
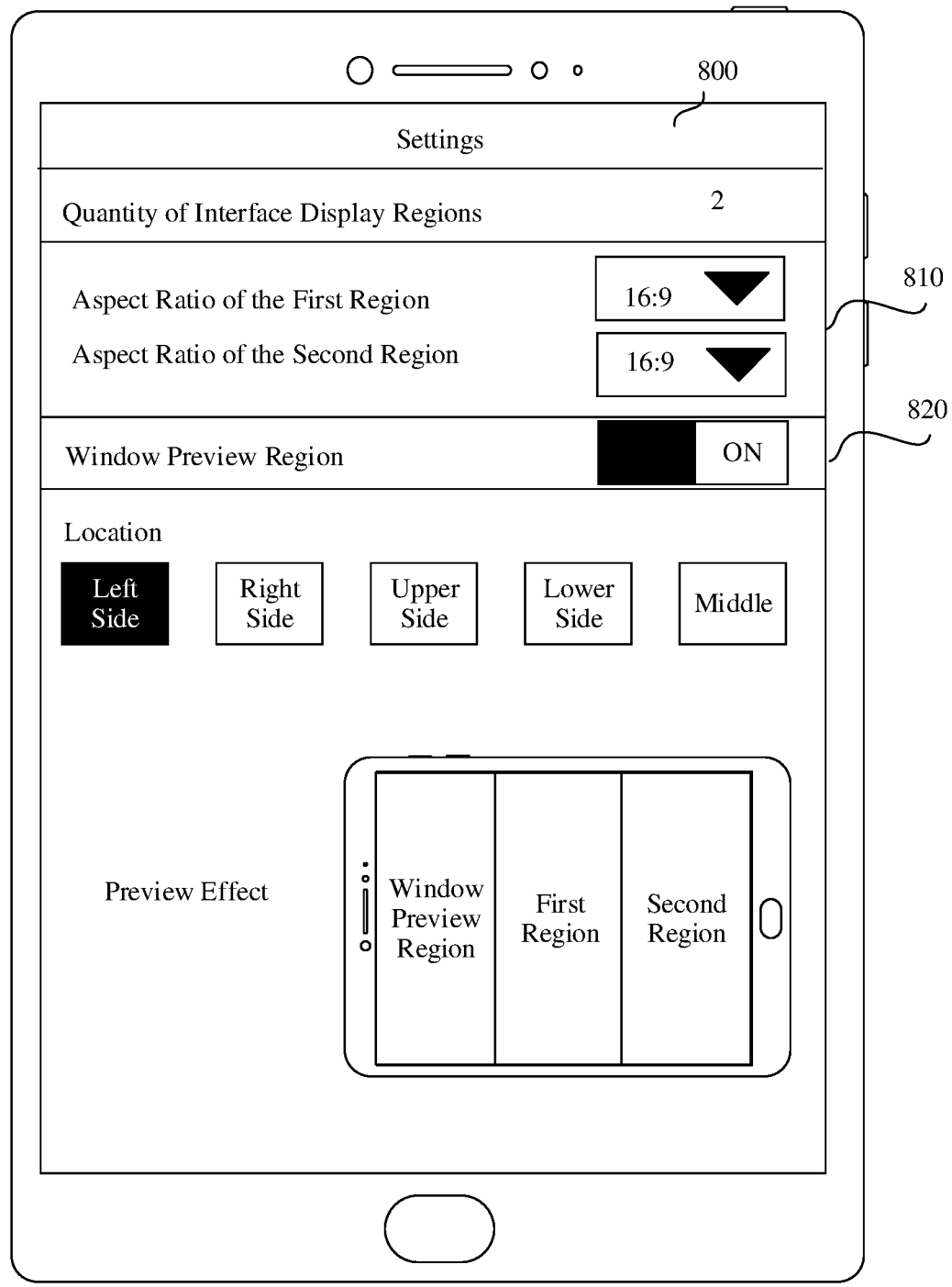
FIG. 8 is a schematic diagram of another user interface displayed by an electronic device in a portrait state according to an embodiment of this application.
Figure 9:
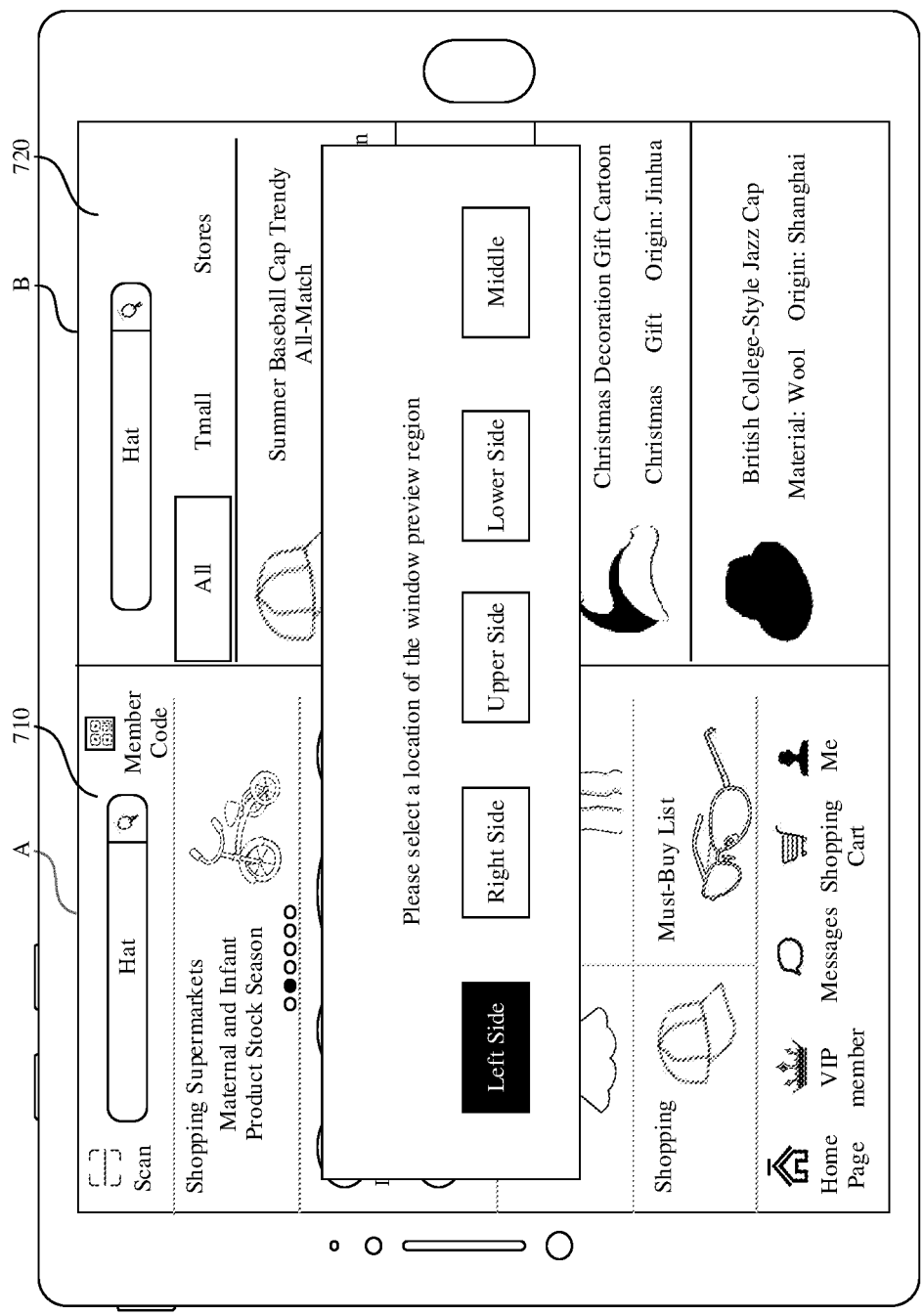
FIG. 9 is a schematic diagram of another user interface displayed by an electronic device in a landscape state according to an embodiment of this application.
Figure 10A:
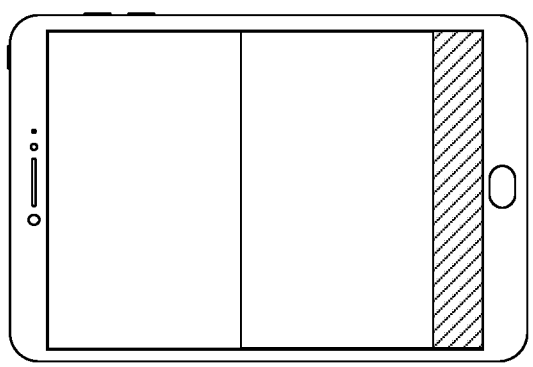
FIG. 10A to FIG. 10D are schematic diagrams of display locations of a window preview region according to an embodiment of this application.
Figure 10B:
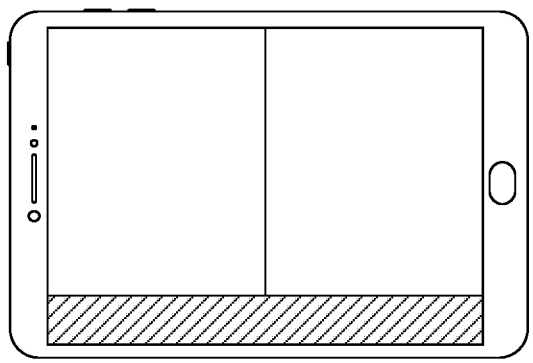
Figure 10C:
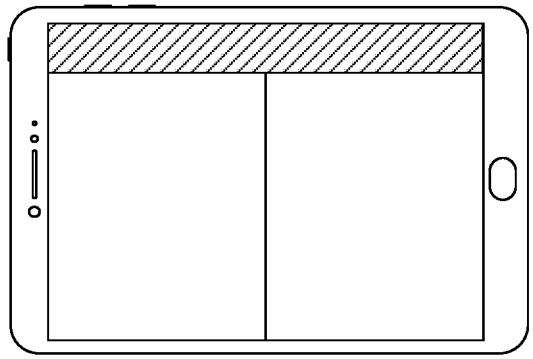
Figure 10D:
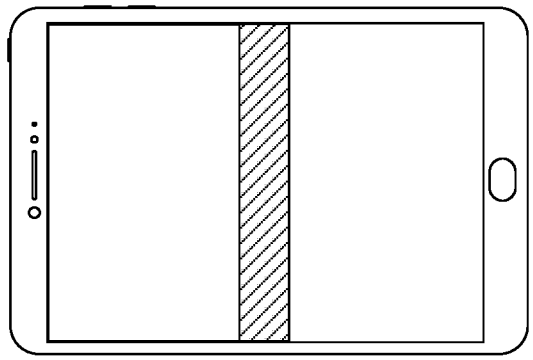

In addition, in this embodiment of this application, the location of the region C used to display the window preview region may be preset by the user based on a requirement of the user. For example, the user may set, by using a user interface 800 shown in FIG. 8, a location used to display the window preview region. For another example, based on the scenario shown in FIG. 7B, the tablet detects the operation 2. In response to the operation 2, the tablet pops up a prompt box for selecting a location of the window preview region on the display. The prompt box includes location options for displaying the window preview region on the display. For example, the location options may include the left side, the right side, the upper side, the lower side, and the middle as shown in FIG. 9. For example, in response to that the location option selected by the user is the left side, in the landscape state, as shown in FIG. 7C, the tablet displays the window preview region in the region C of the display, displays the home page 710' of Taobao in the region D' of the display, and displays the page 720' of the hat search result details in the region E' of the display. This helps improve interaction between the device and the user. For example, when the location option selected by the user is the right side, a display region of the window preview region on the display may be a shadow region shown in FIG. 10A. For another example, when the location option selected by the user is the lower side, a display region of the window preview region on the display may be a shadow region shown in FIG. 10B. For another example, when the location option selected by the user is the upper side, a display region of the window preview region on the display may be a shadow region shown in FIG. 1C. For another example, when the location option selected by the user is the middle, a display region of the window preview region on the display may be a shadow region shown in FIG. 10D.

For another example, the location used to display the window preview region may alternatively be related to a specific operation of the user. For example, based on the scenario shown in FIG. 7B, in the landscape state, when detecting an operation of sliding the left boundary of the display rightward, the tablet displays the window preview region in the region C of the display in response to the operation of sliding the left boundary of the display rightward, where the region C is located on the left side of the display, for example, as shown in FIG. 7C. For another example, in the landscape state, when detecting an operation of sliding the right boundary of the display leftward, the tablet displays the window preview region in the region C of the display in response to the operation of sliding the right boundary of the display leftward, where the region C is located on the right side of the display.

Step 508A: The tablet detects an operation 3, where the operation 3 is used to add a first window to the window preview region, and the first window is a window associated with the first user interface.

For example, the first window may be a small card obtained after a screenshot of the first user interface is scaled down based on a second proportion, or may be a user interface obtained after the first user interface is scaled down based on a third proportion.

For example, the operation 3 may be a gesture operation performed on the first user interface displayed in the region D of the display, for example, a touching and holding operation or a heavy pressing operation performed at a specified location on the first user interface or a blank location on the first user interface, or an operation of pressing a location on the first user interface and dragging the first user interface into the window preview region by a finger of the user. For another example, the operation 3 may alternatively be a voice operation or another operation. This is not limited.

For example, the operation 3 is an operation of dragging the first user interface displayed in the region D into the window preview region. The operation of dragging the first user interface displayed in the region D into the window preview region may be an operation of pressing a location on the first user interface displayed in the region D and then moving the first user interface toward the window preview region by a finger of the user. For example, when the user presses a location on the first user interface displayed in the region D, the tablet may take a screenshot of the first user interface displayed in the region D. In a process in which the screenshot of the first user interface moves toward the window preview region with a finger of the user, the screenshot of the first user interface may be gradually scaled down until the screenshot of the first user interface reaches the window preview region. The screenshot of the first user interface is scaled down to a preset size, to obtain the first window. For another example, when the user presses a location on the first user interface displayed in the region D, the tablet may take a screenshot of the first user interface displayed in the region D, and directly scale down the screenshot of the first user interface to a preset size, to obtain the first window. Then, the first window is moved to the window preview region with the finger of the user, and a size of the first window remains unchanged in the movement process. It should be noted that the location pressed by the finger of the user on the first user interface displayed in the region D may be a fixed location (for example, a top-right location of the region D) or any location. This is not limited.

Step 509A: The tablet adds the first window to the window preview region in response to the operation 3, and displays the first window. The tablet may no longer display the first user interface in the region D of the display. For example, the tablet displays a pattern (for example, a wallpaper pattern), a desktop background, or a blank in the region D of the display. It may be understood that the second user interface displayed by the tablet in the region E of the display basically remains unchanged.

Figure 7D:
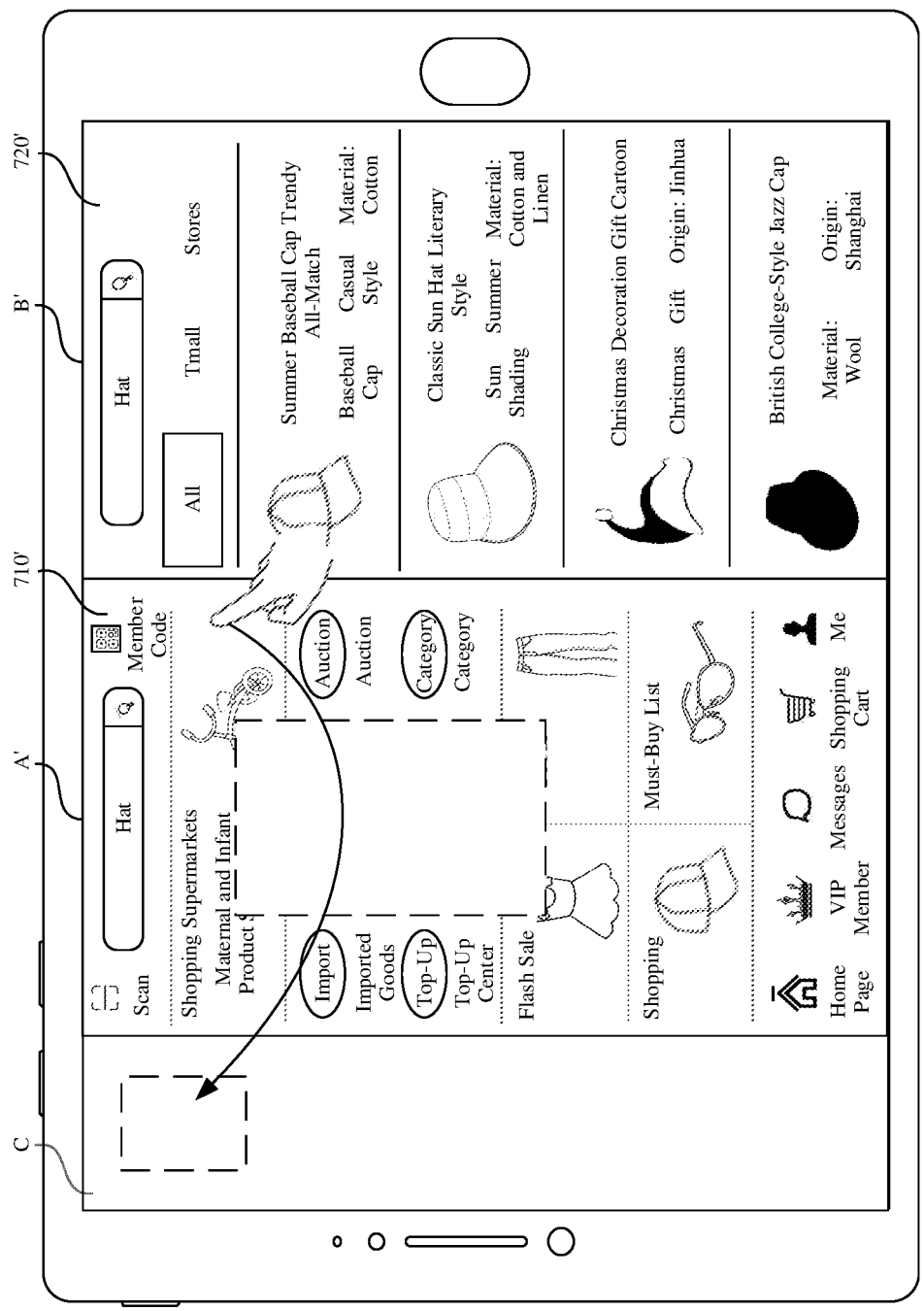
FIG. 7D is a schematic diagram of a user operation according to an embodiment of this application.

For example, in the landscape state, as shown in FIG. 7D, the tablet displays the window preview region in the region C of the display, displays the home page 710' of Taobao in the region D' of the display, and displays the page 720' of the hat search result details in the region E' of the display. Based on the foregoing scenario, the tablet detects an operation of dragging the home page 710' of Taobao displayed in the region D' of the display into the window preview region. In response to the operation, the tablet adds a window 01 to the window preview region, and as shown in FIG. 7F, displays the window preview region in the region C of the display, where the window preview region includes the window 01, and the window 01 is a window associated with the home page 710' of Taobao, and displays a blank in the region D' of the display. The page 720' of the hat search result details continues to be displayed in the region E' of the display, and content of the page 720' of the hat search result details basically remains unchanged.

Figure 7E:
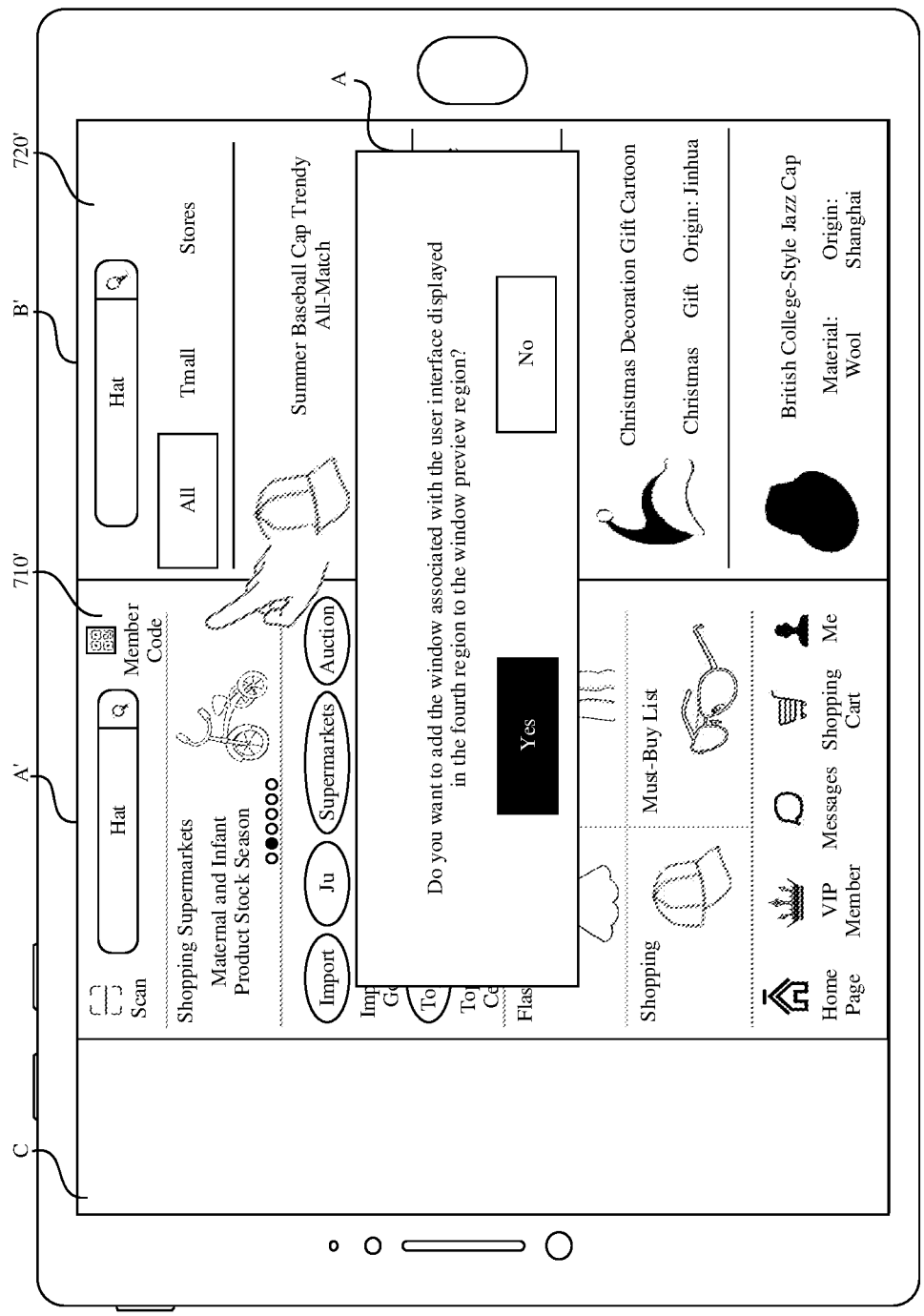
FIG. 7E is a schematic diagram of another user interface displayed by an electronic device in a landscape state according to an embodiment of this application.
Figure 7F:
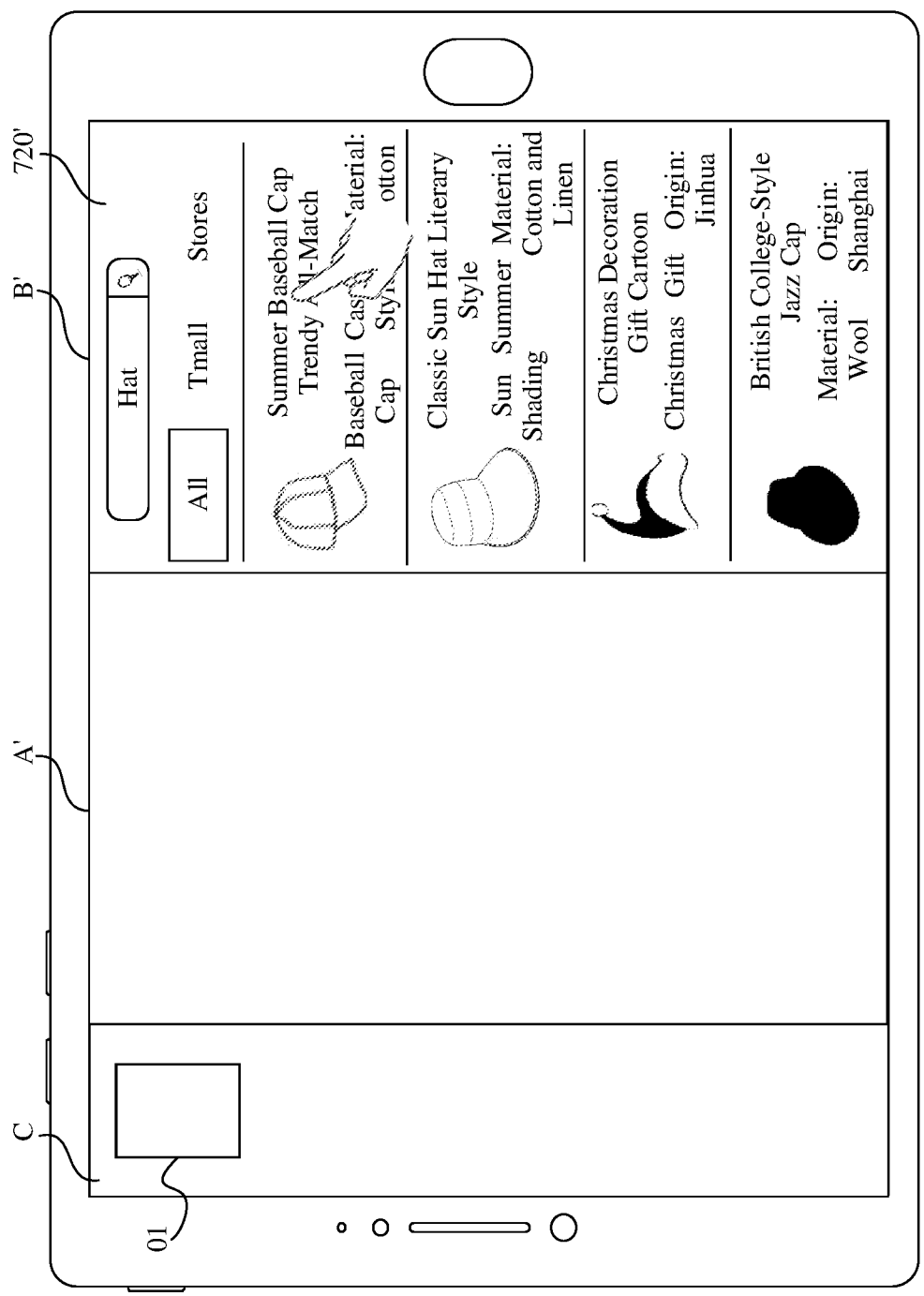
FIG. 7F is a schematic diagram of another user interface displayed by an electronic device in a landscape state according to an embodiment of this application.

For another example, in the landscape state, as shown in FIG. 7E, the tablet displays the window preview region in the region C of the display, displays the home page 710' of Taobao in the region D' of the display, and displays the page 720' of the hat search result details in the region E' of the display. Based on the foregoing scenario, the tablet detects a touching and holding operation performed by the user on a location on the home page 710' of Taobao displayed in the region D', and displays a prompt box A on the display in response to the touching and holding operation. The prompt box A is used to prompt the user whether to add the window associated with the user interface displayed in the region D' to the window preview region, and the prompt box A includes a confirmation option "yes" and a denial option "no". In response to selecting the confirmation option "yes" by the user, the tablet adds the window 01 associated with the home page 710' of Taobao to the window preview region. As shown in FIG. 7F, the window preview region includes the window 01, and the blank is displayed in the region D' of the display. The page 720' of the hat search result details continues to be displayed in the region E' of the display, and the content of the page 720' of the hat search result details basically remains unchanged.

Step 510A: The tablet detects an operation 4 performed by the user on the second user interface in the region E, where the operation 4 is used to open a third user interface of the first application.

For example, the operation 4 may be a gesture operation performed by the user on the second user interface in the region E. For example, the second user interface is the page 720' of the hat search result details shown in FIG. 7F. The operation 4 may be an operation of tapping a hat search result (for example, "summer baseball cap trendy all-match") on the page 720' of the hat search result details by the user. The operation 4 may alternatively be an operation of entering a corresponding search keyword in the search box and tapping the search option.

Step 511A: The tablet displays the third user interface in the region D of the display in response to the operation 4. The window preview region continues to be displayed in the region C of the display, and the window preview region includes the first window. The second user interface continues to be displayed in the region E of the display, and content of the second user interface basically remains unchanged, or a content display effect of the second user interface changes.

For example, in the landscape state, as shown in FIG. 7F, the tablet displays the window preview region in the region C of the display, where the window preview region includes the window oi; displays the blank in the region D' of the display; and displays the page 720' of the hat search result details in a fifth region' of the display. Based on the foregoing scenario, the tablet detects the operation of tapping the hat search result (for example, "summer baseball cap trendy all-match") on the page 720' of the hat search result details, and displays a page 801 of corresponding hat details in the region D' of the display in response to the operation of taping the hat search result. The window preview region continues to be displayed in the region C of the display, the window preview region includes the window 01, and the page 720' of the hat search result details continues to be displayed in the region E' of the display. It should be noted that the content of the page 720' of the hat search result details basically remains unchanged, or a content display effect of the page 720' of the hat search result details changes. For example, one or more of a color, brightness, contrast, a grayscale, or a display form of content of a search result tapped by the user changes, to indicate that the search result is currently opened or has been opened.

Step 512A: The tablet detects an operation 5 performed on the first window, where the operation 5 is used to display the first user interface in the region E.

For example, the operation 5 may be a gesture operation, for example, a tapping operation, a double tapping operation, a dragging operation, a touching and holding operation, or a heavy pressing operation. For example, the operation 5 is an operation of dragging the first window in the window preview region into the region E of the display by the user.

Step 513A: The tablet displays, in the region E of the display in response to the operation 5, the first user interface associated with the first window.

For example, the first user interface may cover the second user interface and be displayed. To be specific, if the user performs an operation on the first user interface in the region E of the display, to close or remove the first user interface, the tablet may display the second user interface in the region E of the display. Alternatively, the second user interface in the region E of the display is replaced with the first user interface. In this case, if the user performs an operation on the first user interface in the region E of the display, to close or remove the first user interface, the tablet may display a blank, a desktop background, a pattern, or the like in the region E of the display.

In some embodiments, the tablet further deletes the first window in the window preview region in response to the operation 5. This helps improve device storage space utilization. In other words, the tablet no longer displays the first window in the window preview region in response to operation 5.

Figure 7G:
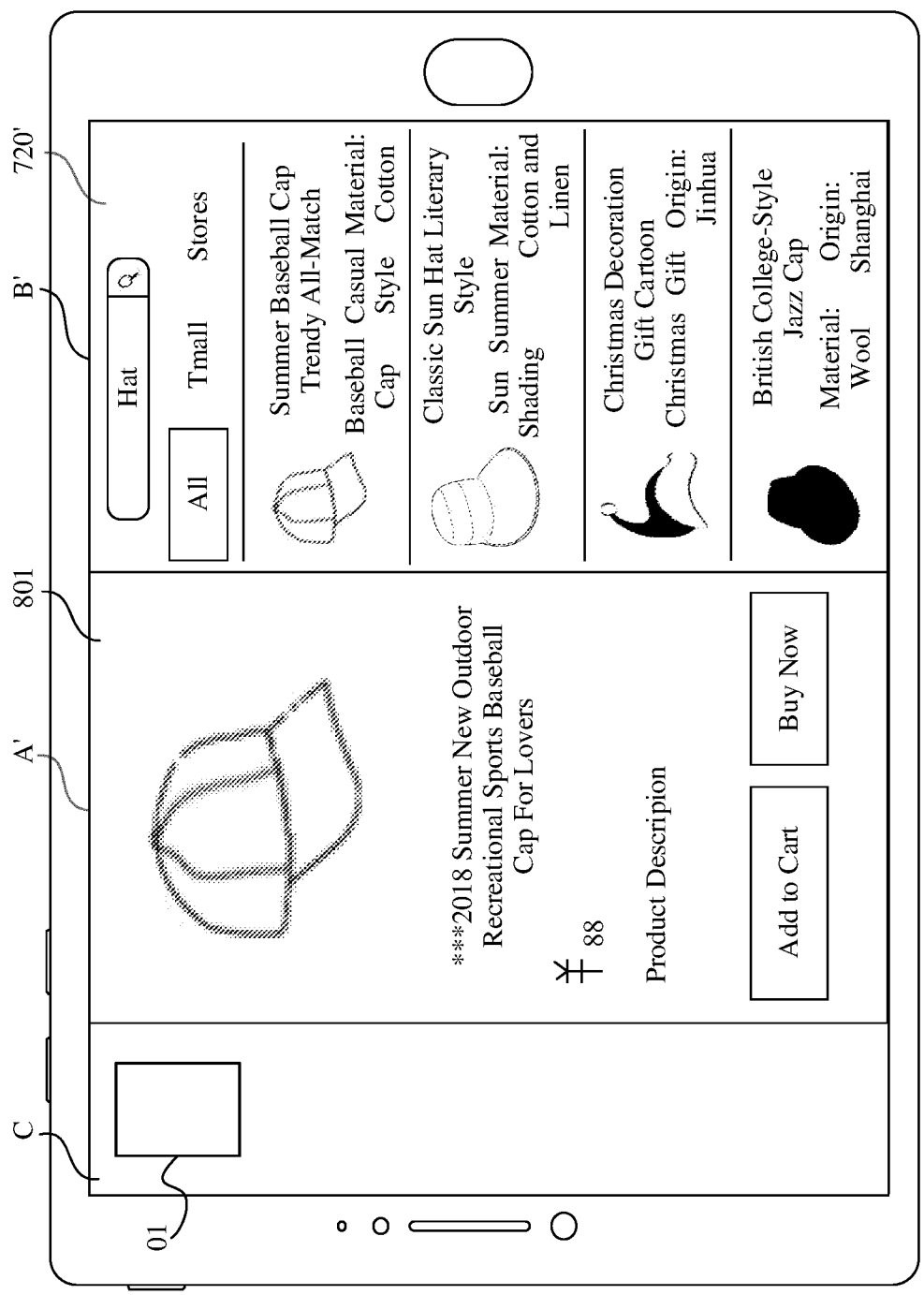
FIG. 7G is a schematic diagram of another user interface displayed by an electronic device in a landscape state according to an embodiment of this application.
Figure 7H:
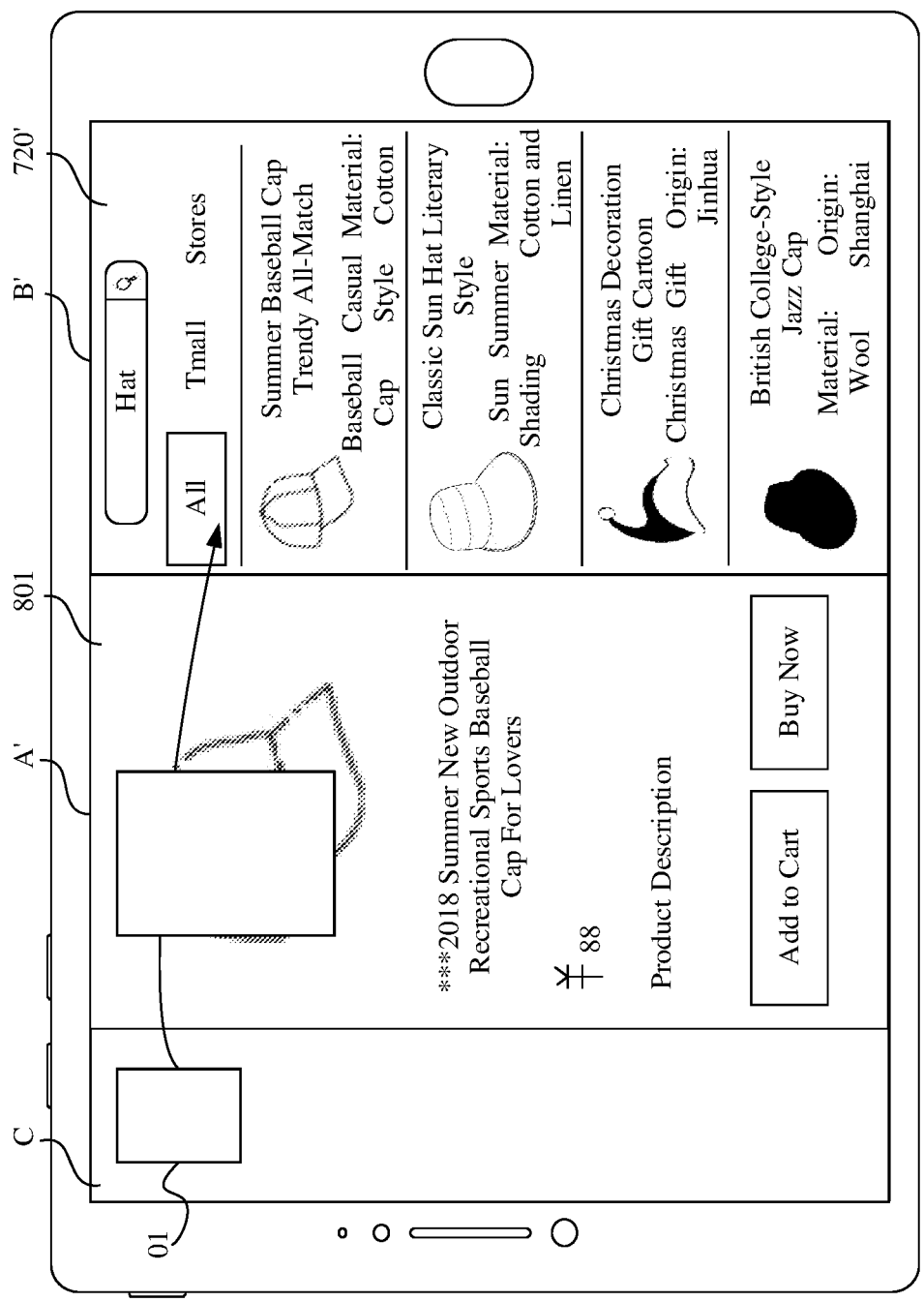
FIG. 7H is a schematic diagram of another user operation according to an embodiment of this application.
Figure 7I:
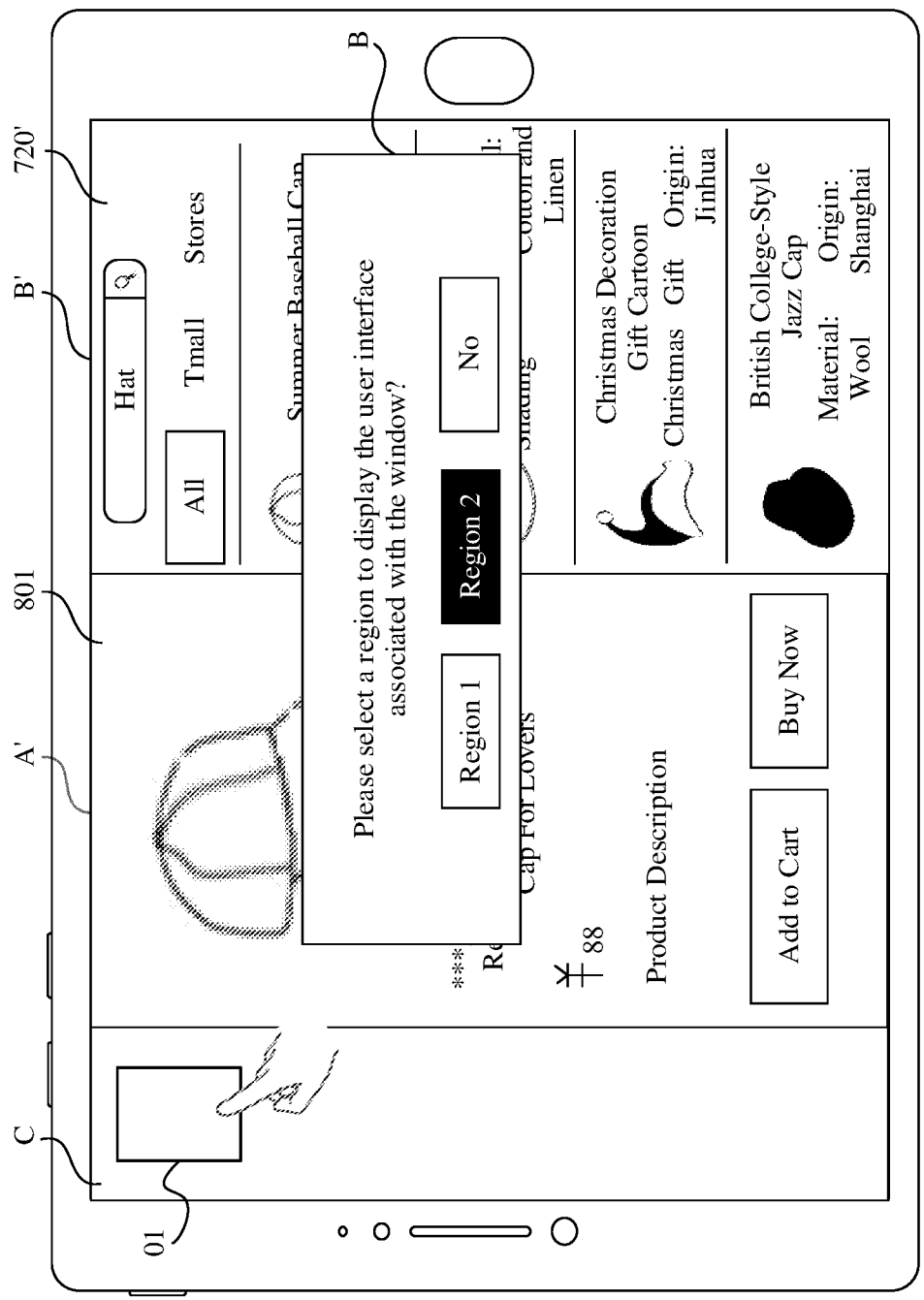
FIG. 7I is a schematic diagram of another user interface displayed by an electronic device in a landscape state according to an embodiment of this application.
Figure 7J:
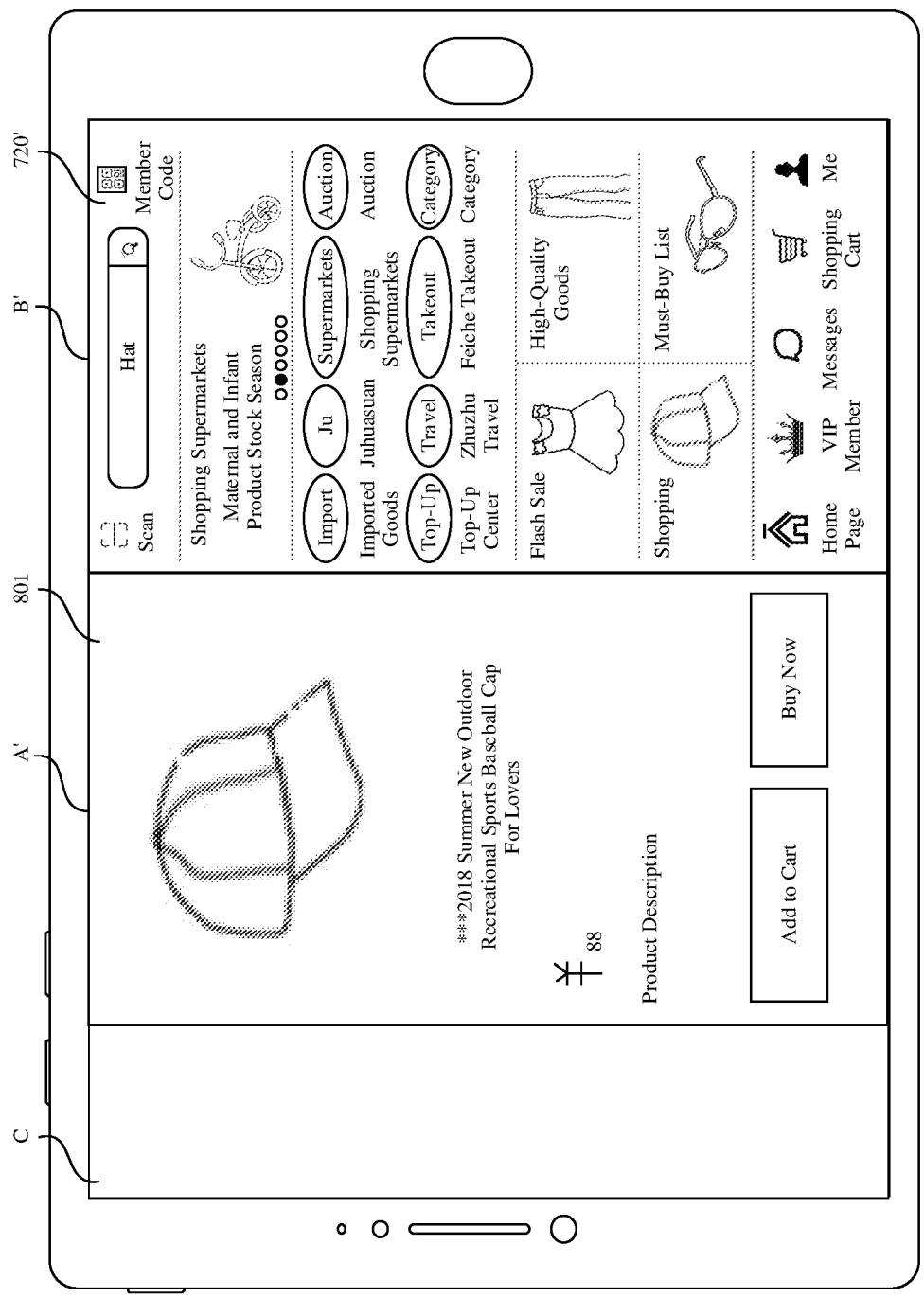
FIG. 7J is a schematic diagram of another user interface displayed by an electronic device in a landscape state according to an embodiment of this application.

For example, in the landscape state, as shown in FIG. 7G, the tablet displays the window preview region in the region C of the display, where the window preview region includes the window 01, and the window 01 is the window associated with the home page 710' of Taobao; displays the page 801 of the hat details in the region D' of the display; and displays the page 720' of the hat search result details in the region E' of the display. Based on the foregoing scenario, the tablet detects an operation of pressing the window 01 displayed in the region C and then moving the window 01 toward the region E' by a finger of the user. In response to the operation, as shown in FIG. 7H, the window 01 is moved toward the region E' along a movement track of the finger of the user. In the movement process, the window 01 may be gradually scaled up. When the window 01 reaches the region E', as shown in FIG. 7J, the tablet displays, in the region E', the home page 710' of Taobao that is associated with the window 01. The window preview region is displayed in the region C of the display, and the window preview region may not include the window 01. The page 801 of the hat details continues to be displayed in the region D' of the display, and content of the page 801 of the hat details basically remains unchanged. In some other embodiments, in a process in which the window 01 is moved toward the region E' along the movement track of the finger of the user, a size of the window 01 may not change. When the window 01 reaches the region E', the home page 710' of Taobao that is associated with the window 01 is displayed in the region E'.

For another example, based on the scenario shown in FIG. 7G, the tablet detects an operation of tapping, double taping, touching and holding, or heavily pressing the window 01 by the user. In response to the operation, in the landscape state, as shown in FIG. 7I, the tablet pops up a prompt box B on the display. The prompt box B is used to prompt the user to select a display region used to display the home page 710' of Taobao that is associated with the window 01. Specifically, the prompt box B includes a "region 1" option, a "region 2" option, and a cancellation option "no". The "region 1" option corresponds to the region D', and the "region 2" option corresponds to the region E'. For example, in response to selecting the "region 2" option by the user, as shown in FIG. 7J, the tablet displays, in the region E', the home page 710' of Taobao that is associated with the window 01. The window preview region continues to be displayed in the region C of the display, and the window preview region may not include the window 01. The page 801 of the hat details continues to be displayed in the region D' of the display, and the content of the page 801 of the hat details basically remains unchanged.

As another alternative step of step 512A and step 513A, after step 511A, step 512B may be included. To be specific, the tablet detects an operation 6 performed on the first window, where the operation 6 is used to display the first user interface in the region D; and displays, in the region D of the display in response to the operation 6, the first user interface associated with the first window.

For example, the operation 6 may be a gesture operation, for example, a tapping operation, a double tapping operation, a dragging operation, a touching and holding operation, or a heavy pressing operation. For example, the operation 6 is an operation of dragging the first window in the window preview region into the region D of the display by the user. For a specific implementation, refer to an implementation in which the tablet detects the operation 5. Details are not described herein again.

In other words, the user may select, based on a requirement of the user, to display, in the region D or the region E of the display, the first user interface associated with the first window.

It should be understood that the display method shown in FIG. 6 is merely an example, and constitutes no limitation on this application. The user may perform an operation on the tablet based on a requirement of the user, to add a corresponding window to the window preview region, and may also perform an operation on the added window in the window preview region based on a requirement of the user.

In this way, the tablet may display, in the region D or the region E of the display, a user interface, associated with the window, of the first application. This manner is not limited by a user interface currently displayed in the region D or the region E of the display, and therefore helps improve interface switching efficiency, and improve user experience.

Figure 7K:
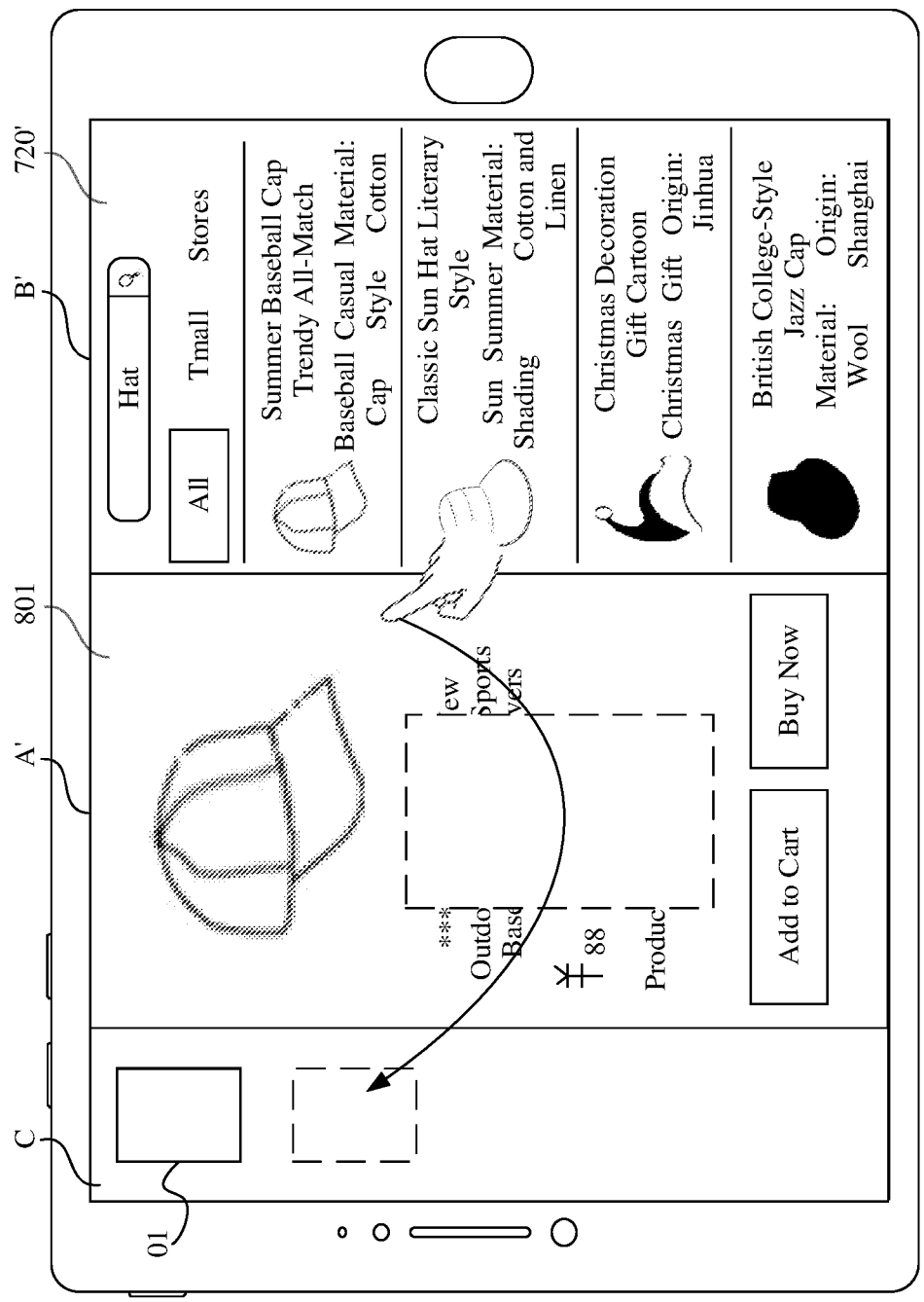
FIG. 7K is a schematic diagram of another user operation according to an embodiment of this application.
Figure 7L:
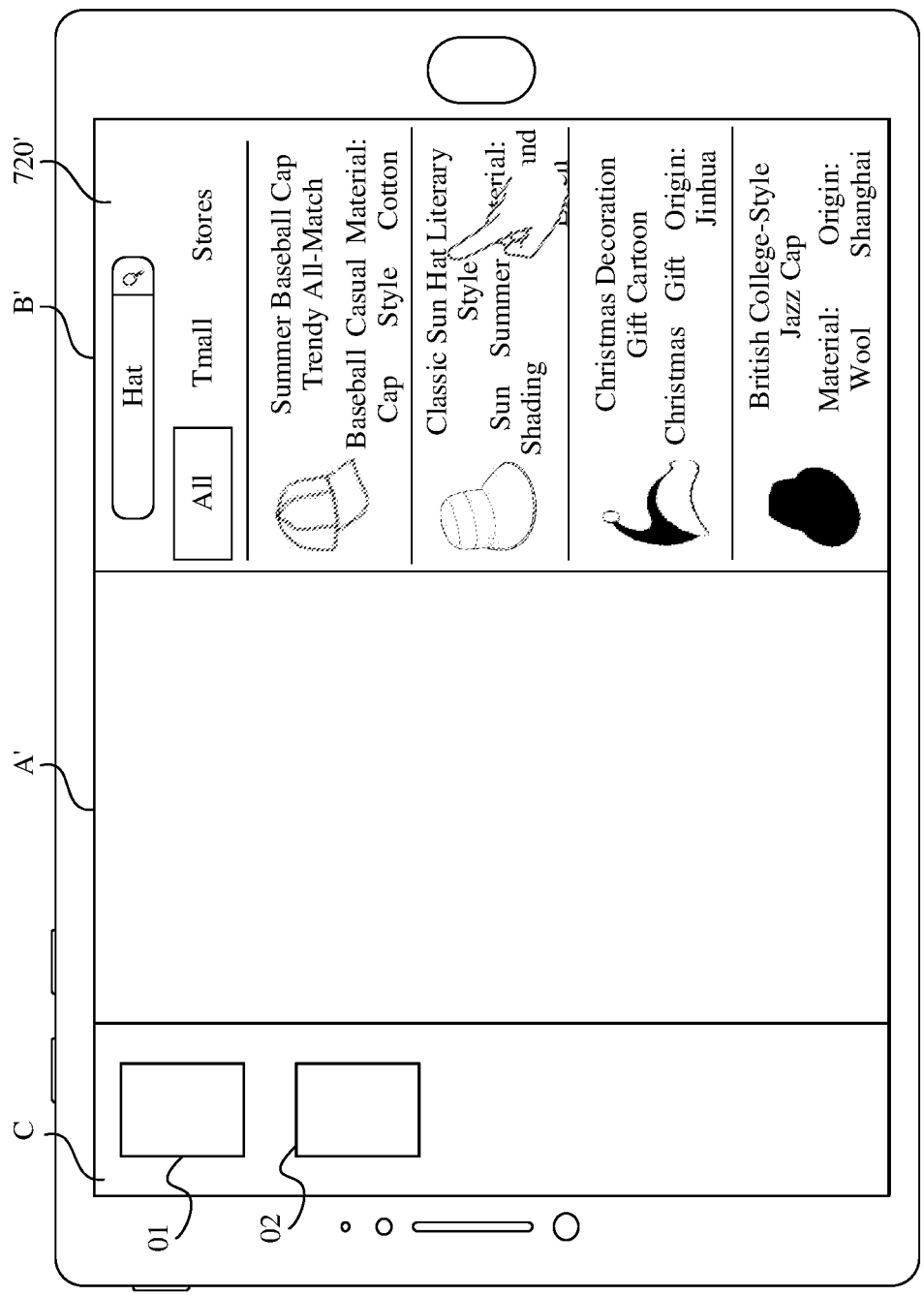
FIG. 7L is a schematic diagram of another user interface displayed by an electronic device in a landscape state according to an embodiment of this application.
Figure 7M:
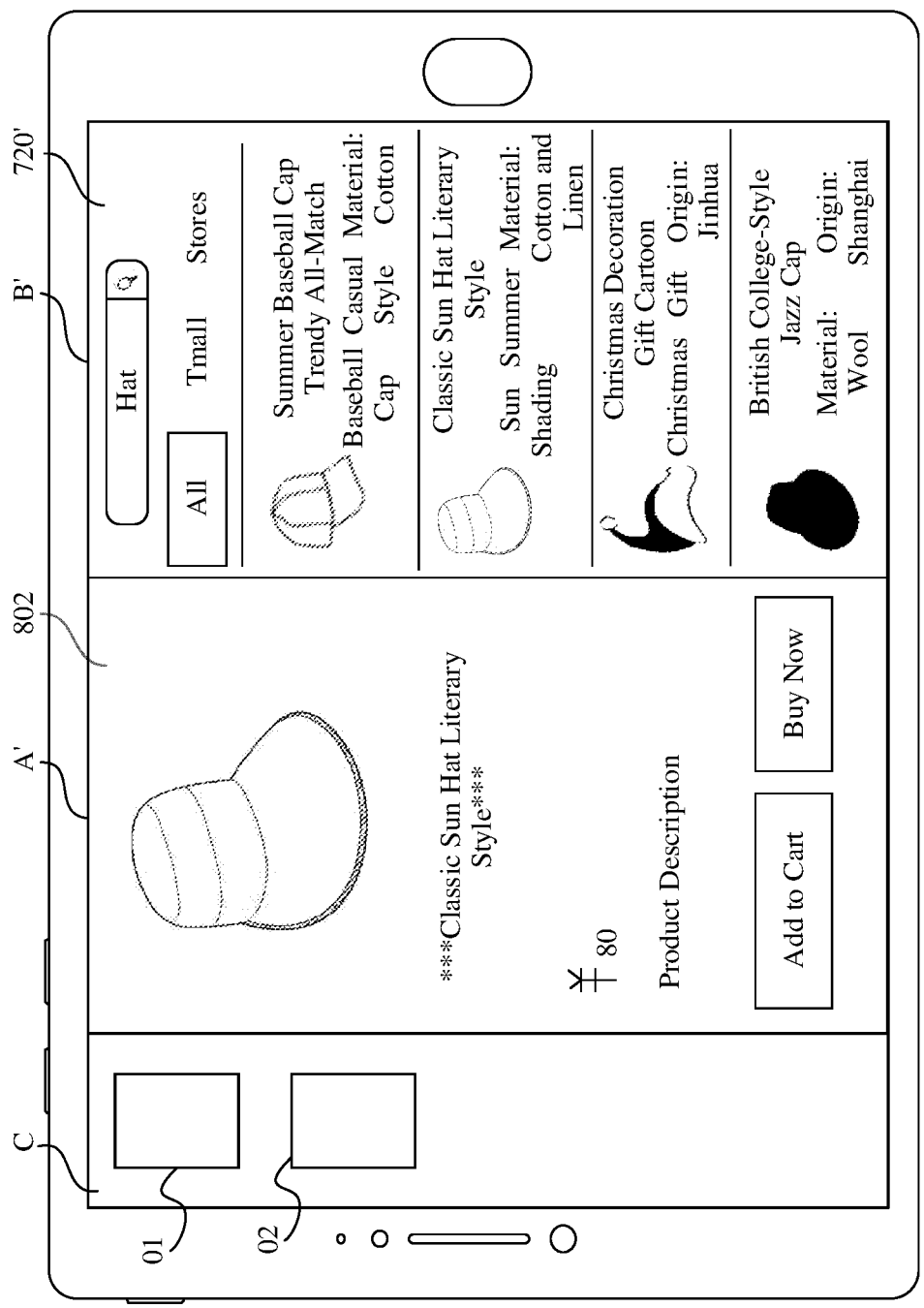
FIG. 7M is a schematic diagram of another user interface displayed by an electronic device in a landscape state according to an embodiment of this application.
Figure 7N:
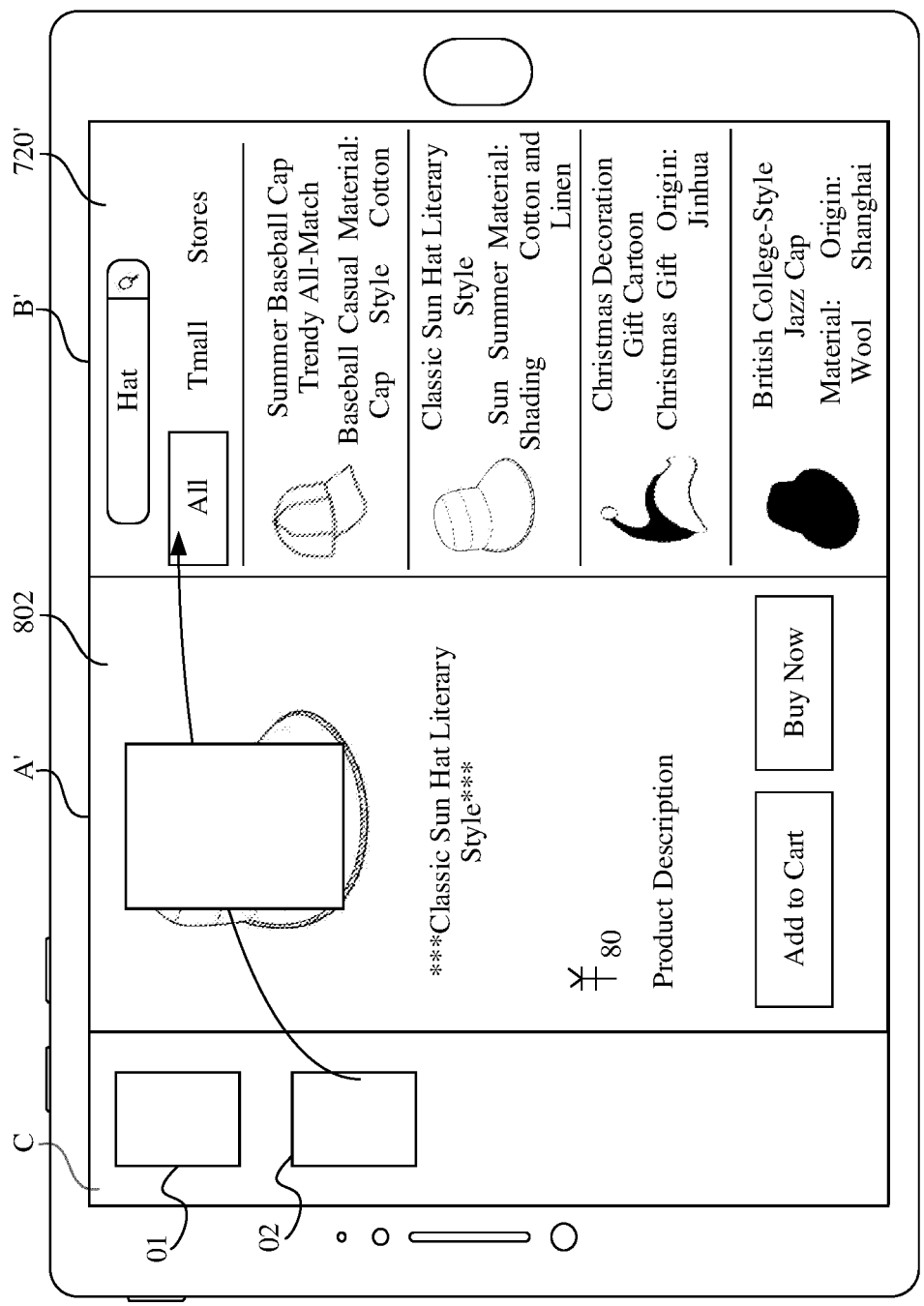
FIG. 7N is a schematic diagram of another user interface displayed by an electronic device in a landscape state according to an embodiment of this application.
Figure 7O:
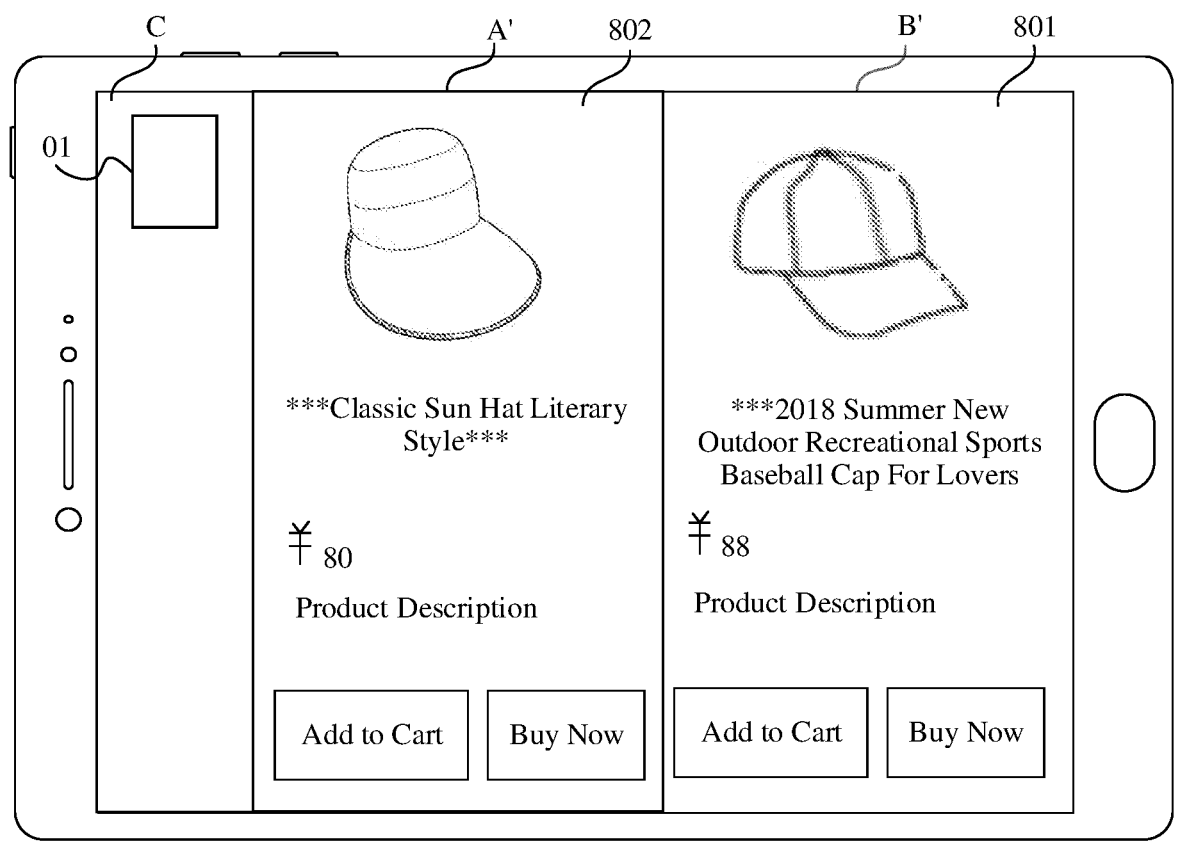
FIG. 7O is a schematic diagram of another user interface displayed by an electronic device in a landscape state according to an embodiment of this application.

For example, in the landscape state, as shown in FIG. 7G, the tablet displays the window preview region in the region C of the display, where the window preview region includes the window 01, and the window 01 is a window associated with the home page 710' of Taobao shown in FIG. 7C; displays the page 801 of the hat details in the region D' of the display; and displays the page 720' of the hat search result details in the region E' of the display. Based on the foregoing scenario, in response to an operation of dragging the page 801 of the hat details into the window preview region by the user as shown in FIG. 7K, as shown in FIG. 7L, the tablet adds a window 02 associated with the page 801 of the hat details to the window preview region, displays the window 02 in the window preview region, and displays the blank in the region D' of the display. Further, in response to tapping another search result (for example, "classic sun hat literary style") on the page 720' of the hat search result details by the user, as shown in FIG. 7M, the tablet displays a page 802 of hat details in the region D' of the display. To compare two different hats, as shown in FIG. 7N, the user may drag the window 02 included in the window preview region into the region E' of the display. In this way, in response to the operation of dragging the window 02 included in the window preview region into the region E' of the display by the user, as shown in FIG. 7O, the tablet may display the page 801 of the hat details in the region E' of the display. This is convenient for the user to compare the two different hats.

Further, because the display region of the display is limited, for ease of viewing the user interface by the user, the user may further perform an operation on the tablet, so that the tablet hides the window preview region. To be specific, the user may perform an operation on the tablet based on a requirement of the user, so that the tablet flexibly displays or hides the window preview region. For example, in the landscape state, the tablet detects an operation of hiding the window preview region, and hides the window preview region in response to the operation of hiding the window preview region.

For example, in the landscape state, the tablet displays the window preview region in the region C of the display, displays the third user interface in the region D of the display, and displays the second user interface in the region E of the display. Based on the scenario, the tablet detects the operation of hiding the window preview region, and hides the window preview region in response to the operation of hiding the window preview region. For example, the tablet may further display a blank, a desktop background, or a pattern in the region C of the display in response to the operation of hiding the window preview region. Alternatively, in response to the operation of hiding the window preview region, the tablet may further scale up the region D to the region A and scale up the region E to the region B based on a preset proportion, and adaptively adjust a size of a user interface displayed in the region D and/or a size of a user interface displayed in the region E, so that the user interfaces are normally displayed in the region A and the region B.

Figure 7P:
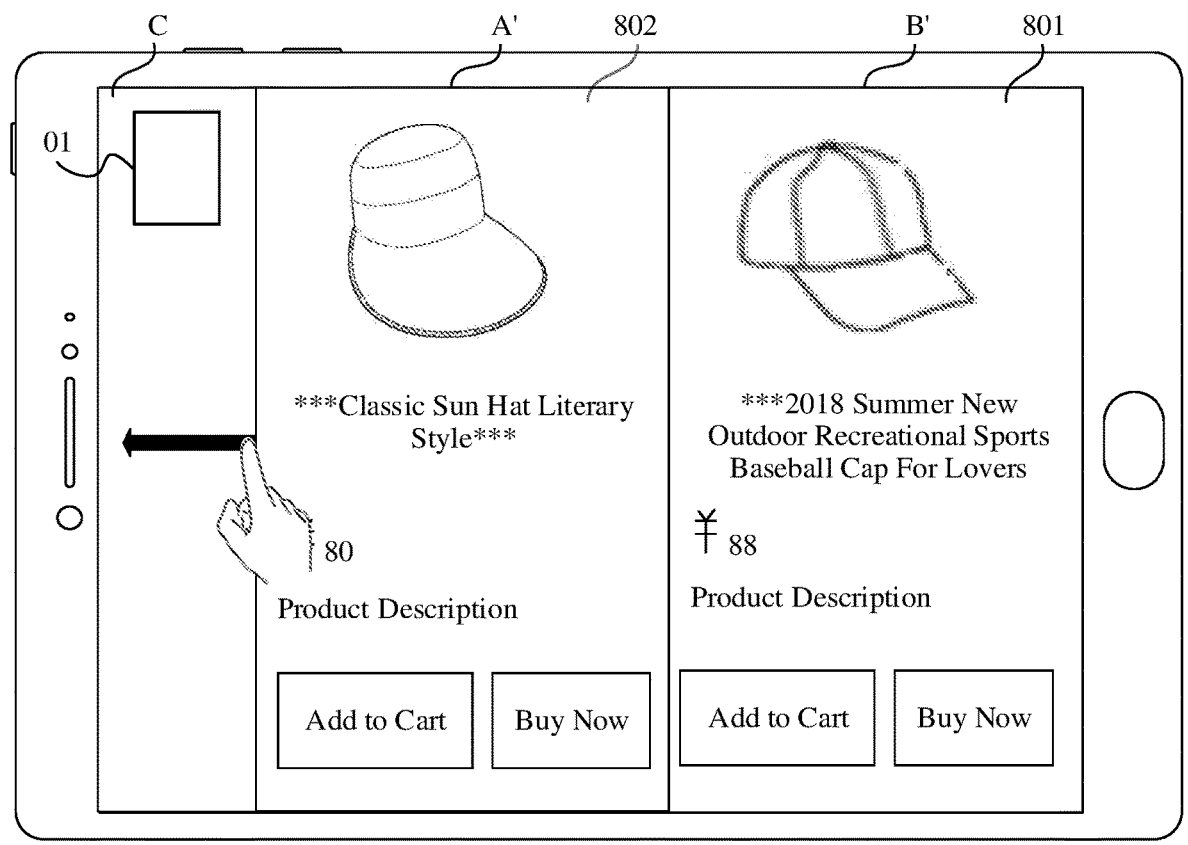
FIG. 7P is a schematic diagram of another user operation according to an embodiment of this application.
Figure 7Q:
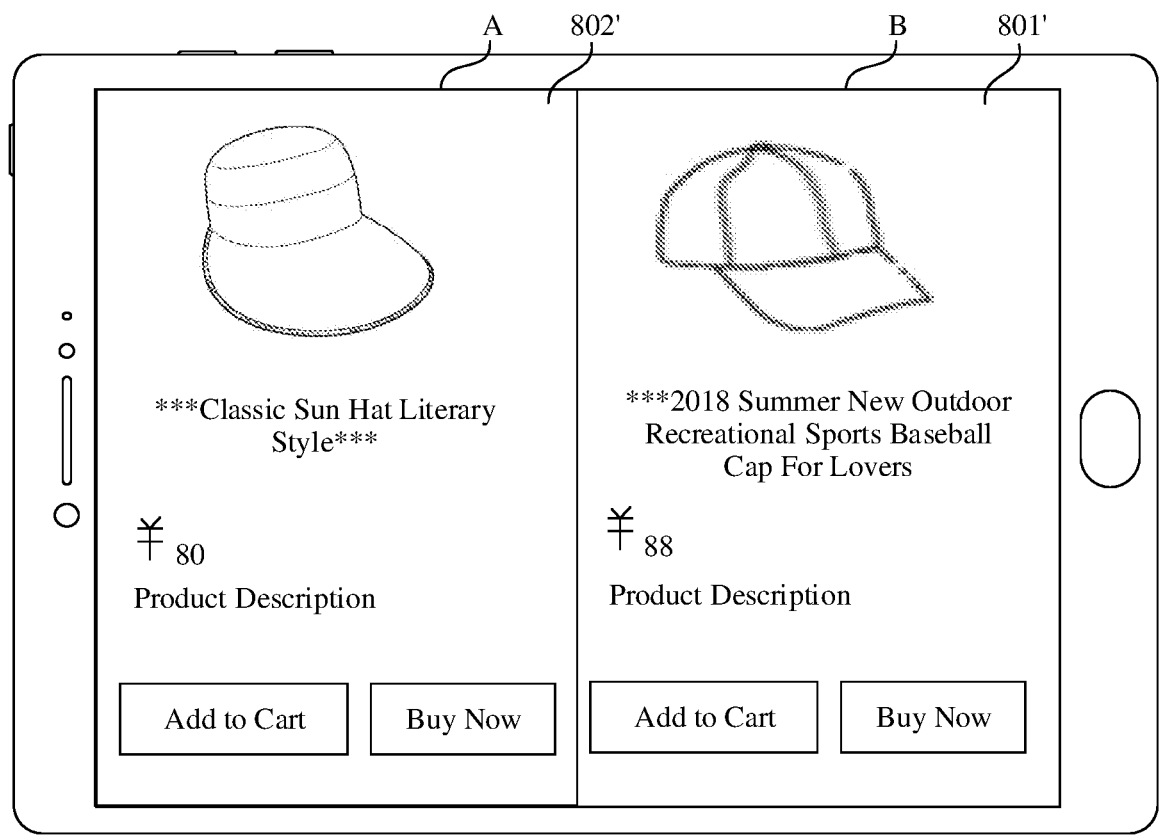
FIG. 7Q is a schematic diagram of another user interface displayed by an electronic device in a landscape state according to an embodiment of this application.

The operation of hiding the window preview region may be a gesture operation, a voice operation, or another operation. For example, the gesture operation may be a sliding operation or another operation. This is not limited. For example, in the landscape state, as shown in FIG. 7O, the tablet displays the window preview region in the region C of the display, displays the page 802 of the hat details in the region D' of the display, and displays the page 801 of the hat details in the region E' of the display. Based on the scenario shown in FIG. 7O, the tablet detects an operation of sliding the right boundary of the window preview region leftward by the user shown in FIG. 7P. In response to the foregoing operation, as shown in FIG. 7Q, the tablet hides the window preview region, scales up the region D' to the region A, scales up the region E' to the region B, displays a page 802' of hat details in the region A of the display, and displays a page 801' of hat details in the region B of the display. The page 802' of the hat details is obtained by adaptively adjusting, by the tablet, a size of the page 802 of the hat details displayed in the region D', and the page 801' of the hat details is obtained by adaptively adjusting, by the tablet, a size of the page 801 of the hat details displayed in the region E'.

Further, when a quantity of added windows in the window preview region exceeds a maximum quantity of windows that can be displayed by the tablet in the region C of the display, the user may slide up and down in the window preview region to view the added windows in the window preview region. It should be noted that, in this embodiment of this application, a quantity of windows that can be added to the window preview region may not be limited, or a quantity of windows that can be added to the window preview region may be limited. For example, a maximum value of the quantity of the windows that can be added to the window preview region may be a default value in the system, or may be set based on a requirement of the user.

For example, when the quantity of the added windows in the window preview region reaches the maximum value, a new window cannot be added to the window preview region, or a new window may continue to be added to the window preview region, but the added window is automatically deleted according to a preset policy, so that the quantity of the added windows in the window preview region does not exceed the maximum value. For example, the maximum value of the quantity of the windows that can be added to the window preview region is n, and the added windows in the window preview region include a window 1, a window 2, a window 3, . . . , and a window n. The window 1, the window 2, the window 3, . . . , and the window n are arranged in chronological order. The window 1 is a window that is first added to the window preview region, and the window n is a window that is last added to the window preview region. When the tablet detects that a window (n+1) is added to the window preview region, the tablet may delete the window 1 in the window preview region, and add the window (n+1) to the window preview region. For another example, the maximum value of the quantity of the windows that can be added to the window preview region is m, and the added windows in the window preview region include a window 1, a window 2, a window 3, . . . , and a window m. The window 1, the window 2, the window 3, . . . , and the window m are arranged in ascending order of quantities of historical browsing times. The window 1 is a window with a smallest quantity of historical browsing times in the m windows, and the window m is a window with a largest quantity of historical browsing times in the m windows. In this case, when the tablet detects that a window (m+1) is added to the window preview region, the tablet may delete the window 1 in the window preview region, and add the window (m+1) to the window preview region.

In some embodiments, to help the user manage the added windows in the window preview region, the user may delete the added window in the window preview region based on a requirement of the user. For example, in the landscape state, the tablet displays the window preview region in the region C of the display, displays the first user interface in the region D of the display, and displays the second user interface, the blank, the desktop background, or the pattern in the region E of the display. Based on the foregoing scenario, when receiving an operation of deleting the added window in the window preview region, the tablet deletes the corresponding window. For example, the operation of deleting the added window in the window preview region may be an operation of touching and holding or heavily pressing a window in the window preview region. This is not limited.

Figure 7R:
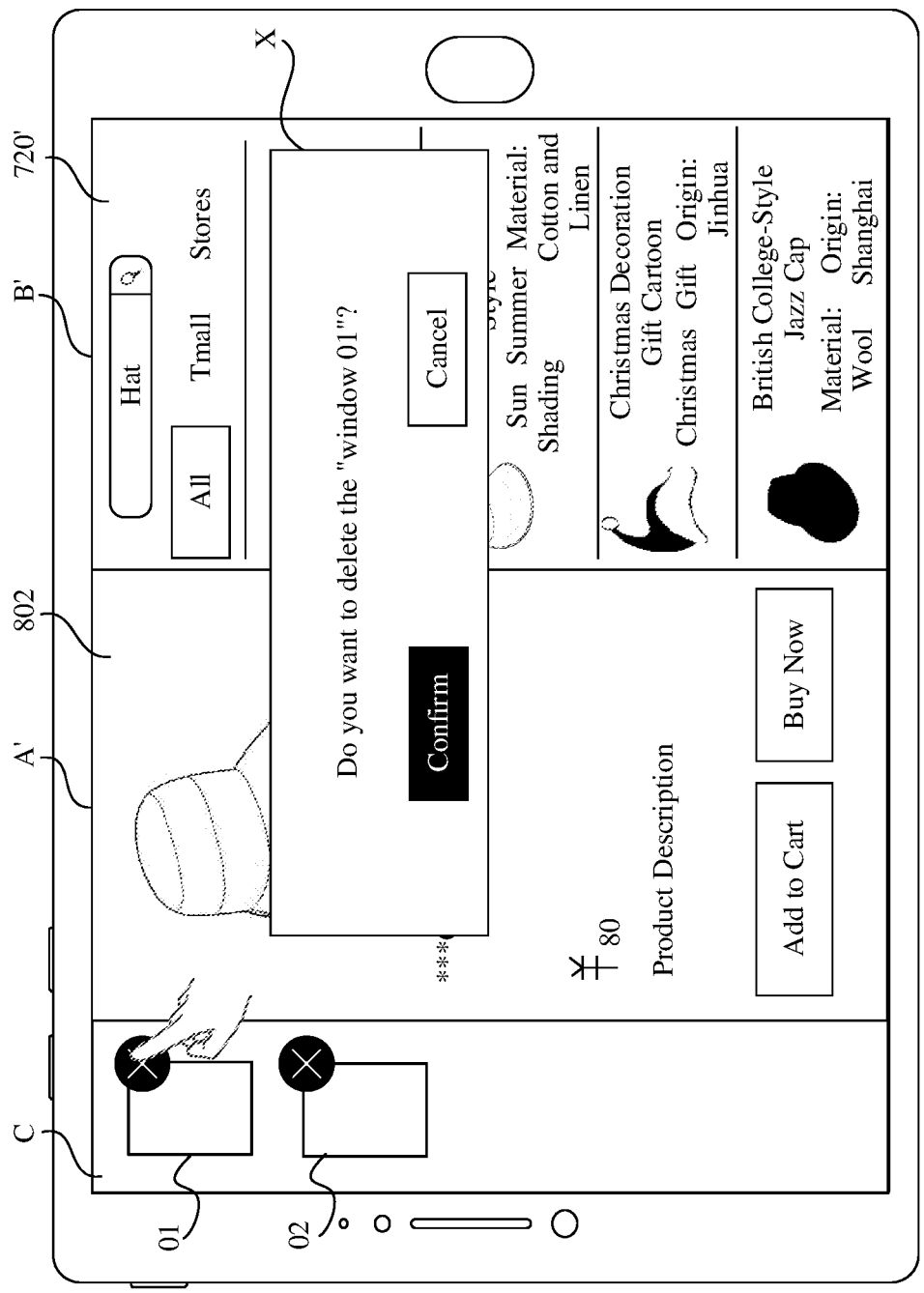
FIG. 7R is a schematic diagram of another user interface displayed by an electronic device in a landscape state according to an embodiment of this application.

For example, in the landscape state, as shown in FIG. 7R, the tablet displays the window preview region in the region C of the display, where the window preview region includes the window 01 and the window 02; displays the page 801 of the hat details in the region D' of the display; and displays the page 802 of the hat details in the region E' of the display. Based on the foregoing scenario, the tablet receives an operation of touching and holding the window 01, and displays deletion icons in the upper right corners of the window 01 and the window 02. When the user selects the deletion icon in the upper right corner of the window 01, a prompt box X pops up on the display. The prompt box X includes prompt information asking the user to confirm whether to delete the window 01, a confirmation option, and a cancellation option. In response to the user selecting the confirmation option, the tablet deletes the window 01 in the window preview region, and hides the prompt box X. In response to the user selecting the cancellation option, the tablet retains the window 01 in the window preview region, and hides the prompt box X.

In some other embodiments, as an alternative step of 510A to 513A, after step 509A is performed, step 510C may be performed by the tablet. To be specific, in the landscape state, the tablet detects an operation of exiting the first application, and displays the desktop in full screen on the display in response to the operation of exiting the first application. For example, the operation of exiting the first application may be an operation of pressing a button on the home screen, or may be a shortcut gesture operation. This is not limited.

For example, as shown in FIG. 7F, in the landscape state, the tablet displays the window preview region in the region C of the display, where the window preview region includes the window 01; displays the blank in the region D' of the display; and displays the page 720' of the hat search result details in the region E' of the display. Based on the scenario shown in FIG. 7F, the tablet detects an operation of exiting Taobao, and displays the desktop in full screen on the display in response to the operation of exiting Taobao. In the landscape state, the tablet further detects an operation of starting Taobao. In this case, the tablet displays the window preview region in the region C of the display, where the window preview region includes the window 01; displays the blank in the region D' of the display; and displays the page 720' of the hat search result details in the region E' of the display. In other words, after Taobao is exited, when Taobao is started again, an interface presented on the display is the same as an interface presented before Taobao is exited.

Alternatively, after performing step 509A, the tablet may further perform step 510C. To be specific, in the landscape state, the tablet detects an operation of exiting the first application, and further deletes the added window in the window preview region in response to the operation of exiting the first application. For example, based on the scenario shown in FIG. 7F, in the landscape state, the tablet detects the operation of exiting Taobao, deletes the added window 01 in the window preview region, and displays the desktop in full screen on the display. In this case, after Taobao is exited, when Taobao is started again, the window preview region displayed in the region C of the display does not include a window, or the window preview region is no longer displayed on the display.

In another embodiment, as alternative steps of step 501A to step 503A, before step 504A, the following steps may be performed by the tablet:

Step 501D: The tablet displays the first user interface of the first application in full screen in a portrait state.

Step 502D: The tablet detects an operation of switching the tablet from the portrait state to the landscape state by the user.

Step 503D: The tablet displays, in the landscape state, the first user interface in the region A of the display in response to the operation of switching the tablet from the portrait state to the landscape state by the user.

Figure 7S:
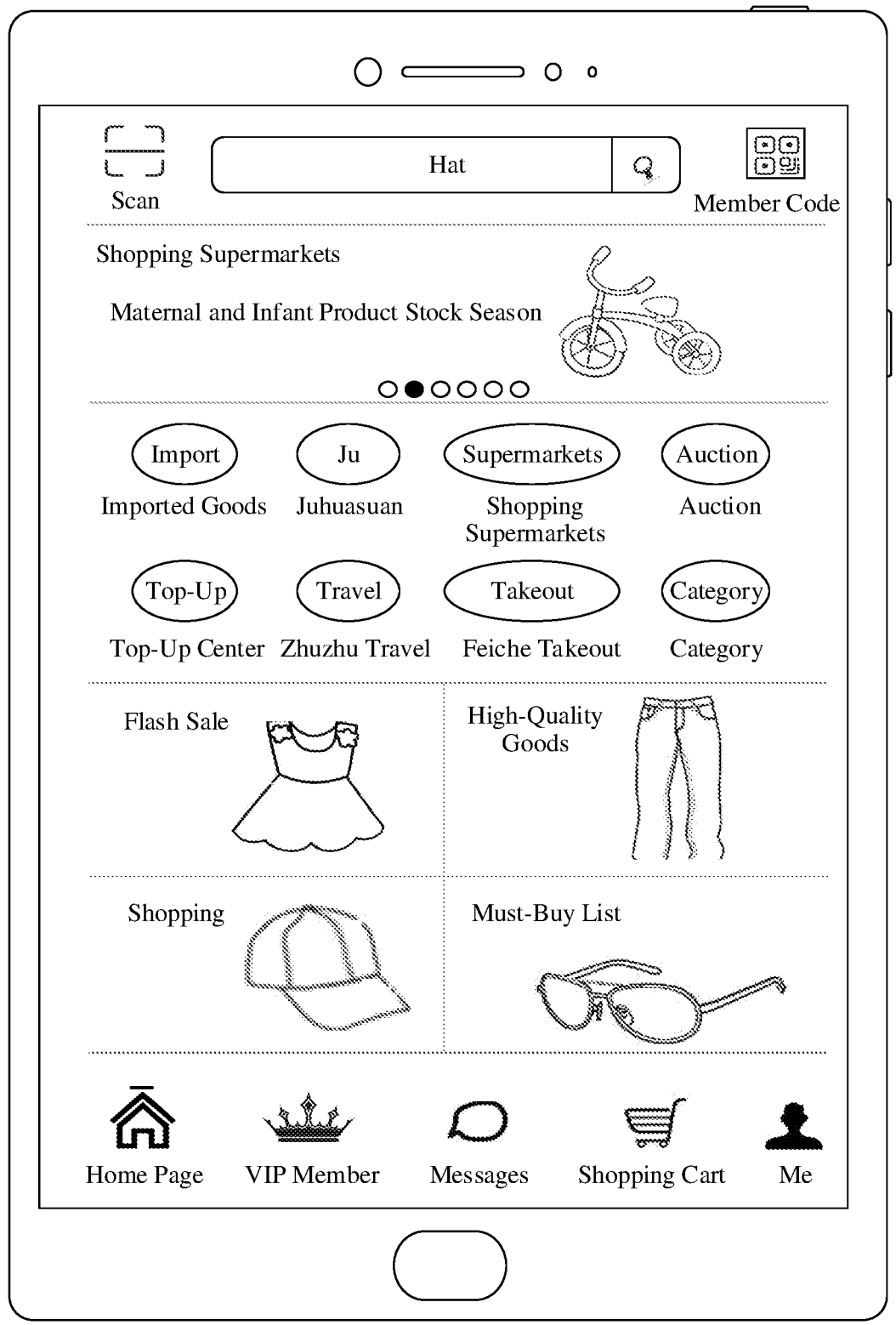
FIG. 7S is a schematic diagram of a user interface displayed by an electronic device in a portrait state according to an embodiment of this application.

To be specific, in the portrait state, the tablet has started the first application, and displays the first user interface on the display. For example, the first user interface of the first application is the home page of Taobao. As shown in FIG. 7S, the tablet displays the home page of Taobao in full screen in the portrait state. Then, refer to FIG. 7A. In response to the operation of switching the tablet from the portrait state to the landscape state by the user (for example, an operation of switching the tablet from the state shown in FIG. 7S to the state shown in FIG. 1A), in step 504A, the tablet displays the home page of Taobao in the region A of the display in the landscape state.

Figure 7T:
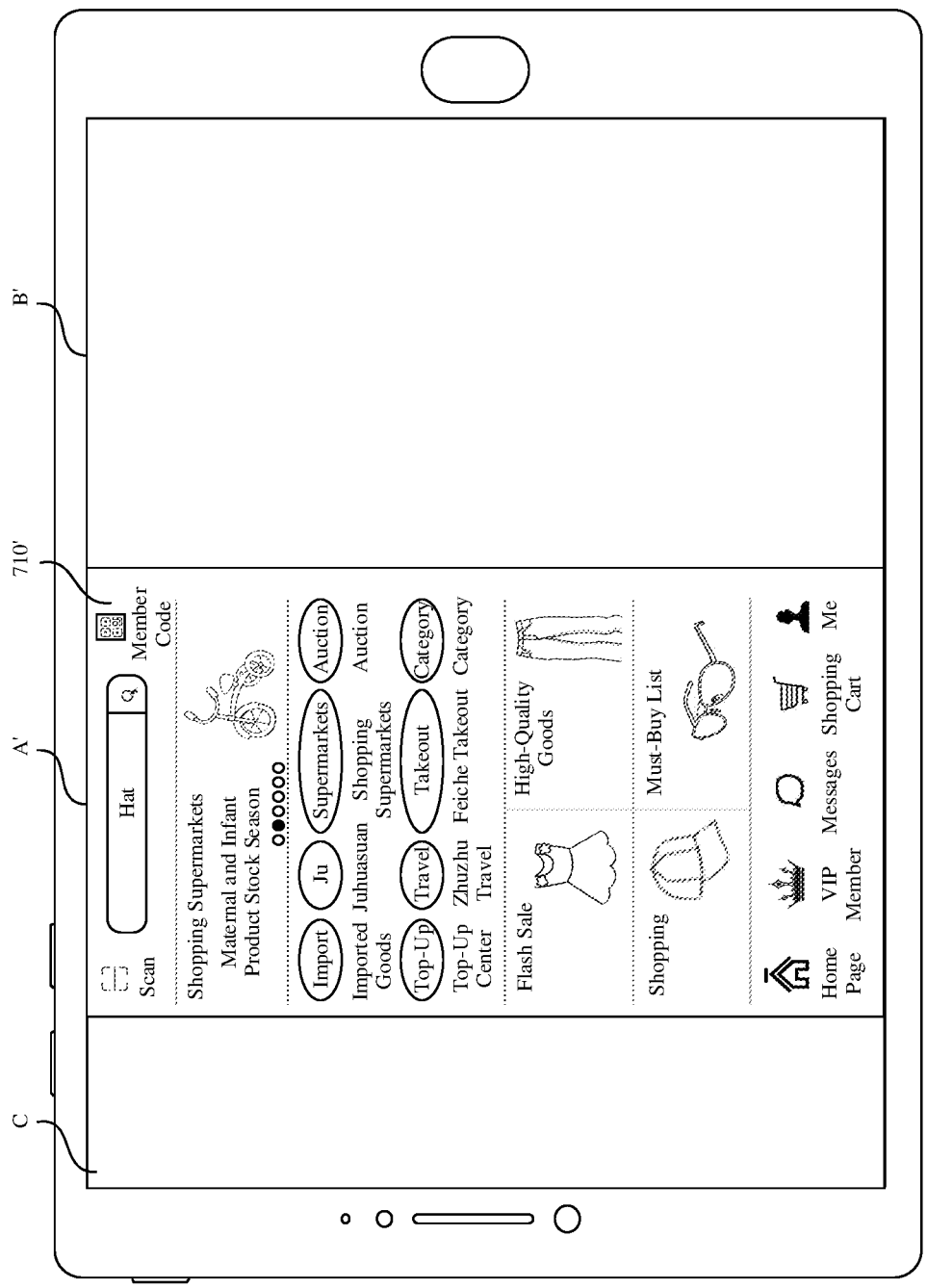
FIG. 7T is a schematic diagram of another user interface displayed by an electronic device in a landscape state according to an embodiment of this application.

It may be understood that, for ease of implementation, in another embodiment of this application, the tablet always displays the window preview region in the landscape state. To be specific, in the landscape state, the tablet displays the window preview region in a corresponding region (for example, the region C) of the display regardless of which user interface of the first application is displayed on the display. For example, in the landscape state, in response to the operation of starting the first application, as shown in FIG. 7T, the tablet displays the window preview region in the region C of the display, displays the home page 710' of Taobao in the region D' of the display, and displays a blank in the region E' of the display. Alternatively, when displaying the home page 710' of Taobao in the portrait state, the tablet detects the operation of switching the tablet from the portrait state to the landscape state. In response to the operation, as shown in FIG. 7T, the tablet displays the window preview region in the region C of the display, displays the home page 710' in the region D' of the display, and displays a blank in the region E' of the display.

Figure 11A:
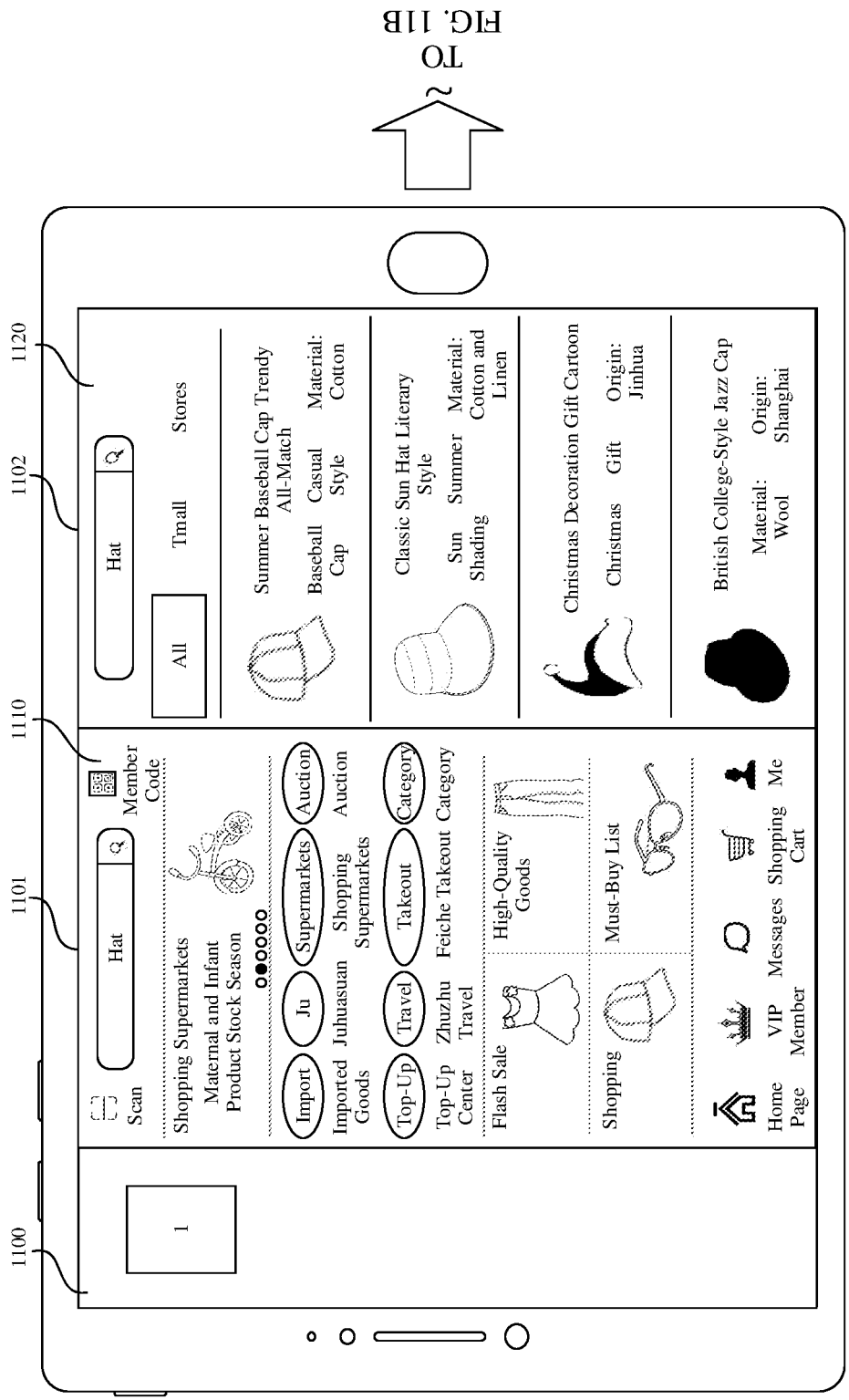
FIG. 11A and FIG. 11B are schematic diagrams of a user interface displayed by an electronic device according to an embodiment of this application.
Figure 11B:
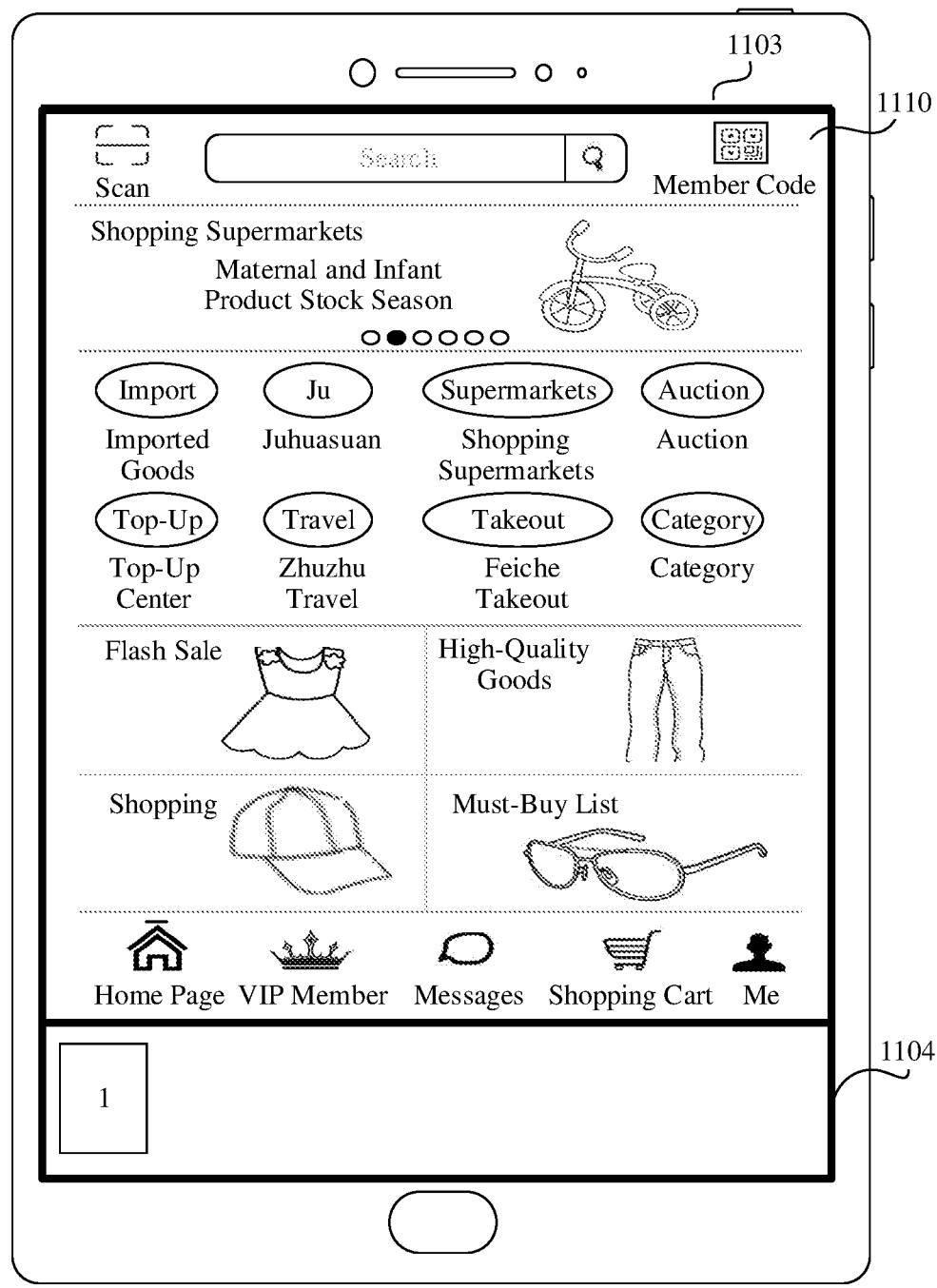

In addition, as shown in FIG. 11A and FIG. 11B, in the landscape state, the tablet displays the window preview region in a region 1100 of the display, displays a home page 1110 of Taobao in a region 1101 of the display, and displays a page 1120 of hat search result details in a region 1102 of the display. The window preview region includes a window 1. When the tablet is switched from the landscape state to the portrait state, the home page 1110 of Taobao may be displayed in a region 1103 of the display, and the window preview region is displayed in a region 1104 of the display. The window preview region includes the window 1. Alternatively, the home page 1110 of Taobao is displayed on the display, and the window preview region is not displayed. In some other embodiments, in response to switching from the landscape state to the portrait state, the tablet may further display the page 1120 of the hat search result details in the region 1103 of the display. Specifically, whether an interface in the region 1101 or an interface in the region 1102 is displayed in the region 1103 of the display may be determined according to a preset rule. The preset rule may be set by the user, or may be a default rule in the system.

Figure 12:
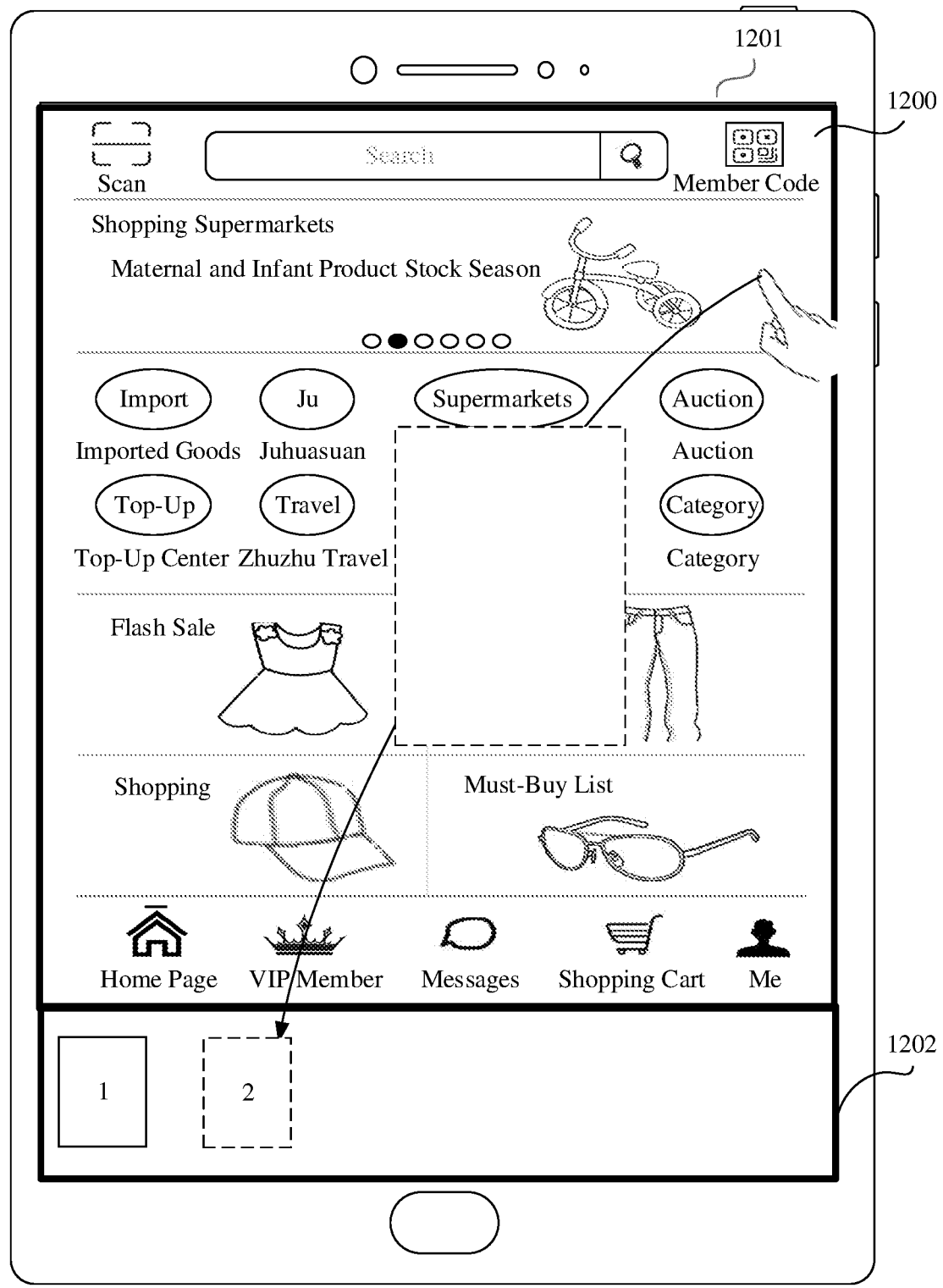
FIG. 12 is a schematic diagram of another user operation according to an embodiment of this application.

In the portrait state, the tablet usually displays one user interface. For normal use of the user, the tablet continues to display the user interface on the display in response to an operation of adding, to the window preview region by the user, a window associated with the currently displayed user interface. For example, as shown in FIG. 12, in the portrait state, the tablet displays a user interface 1200 in a region 1201 of the display, displays the window preview region in a region 1202 of the display, and in response to an operation of dragging the user interface 1200 into the window preview region by the user, adds a window 2 associated with the user interface to the window preview region, but continues to display the user interface 1200 in the region 1201 of the display.

In still some embodiments, the tablet may further automatically add a window associated with a historically opened user interface to the window preview region. For example, after starting the first application, the tablet may detect that a user interface of the first application is displayed on the display. In this case, the tablet determines whether the window preview region includes a window associated with the user interface, and if the window preview region does not include the window associated with the user interface, adds the window associated with the user interface to the window preview region.

Figure 13:
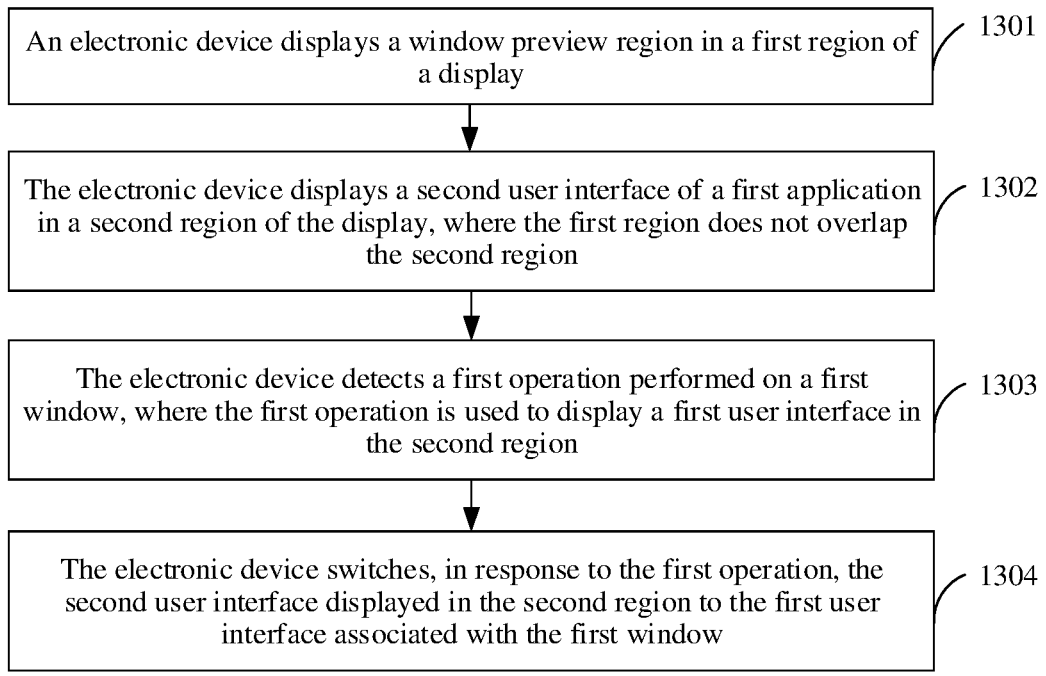
FIG. 13 is a schematic flowchart of another display method according to an embodiment of this application.

Based on the foregoing embodiments, FIG. 13 shows a display method according to an embodiment of this application. The display method specifically includes the following steps:

Step 1301: An electronic device displays a window preview region in a first region of a display, where the window preview region includes a first window, and the first window is a window associated with a first user interface of a first application.

Step 1302: The electronic device displays a second user interface of the first application in a second region of the display, where the first region does not overlap the second region.

Step 1303: The electronic device detects a first operation performed on the first window, where the first operation is used to display the first user interface in the second region.

Step 1304: The electronic device switches, in response to the first operation, the second user interface displayed in the second region to the first user interface associated with the first window.

For a specific related implementation of the display method shown in FIG. 13, refer to related descriptions in the foregoing embodiments. Details are not described herein again.

The foregoing embodiments in this application may be used separately, or may be used in combination, to achieve different technical effects.

In the foregoing embodiments provided in this application, the method provided in the embodiments of this application is described from a perspective in which the electronic device serves as an execution body. To implement the functions in the method provided in the foregoing embodiments of this application, the electronic device may include a hardware structure and/or a software module, to implement the functions in a form of the hardware structure, the software module, or a combination of the hardware structure and the software module. Whether a function in the foregoing functions is performed by the hardware structure, the software module, or the combination of the hardware structure and the software module depends on specific applications and design constraint conditions of the technical solutions.

Figure 14:
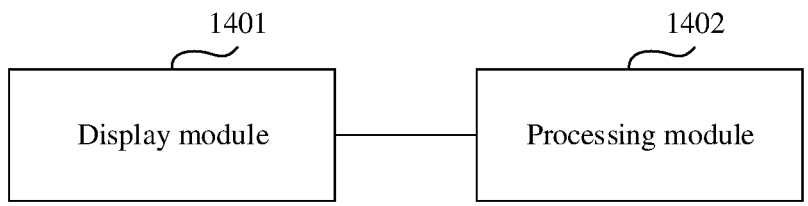
FIG. 14 is a schematic diagram of a structure of an electronic device according to an embodiment of this application.

Based on the same concept, FIG. 14 shows a device 1400 according to this application. The device 1400 is configured to perform the display method shown in FIG. 5A and FIG. 5B or FIG. 13. For example, the device 1400 includes a display module 1401 and a processing module 1402.

For example, the display module 1401 is configured to display a user interface or a window preview region, and the processing module 1402 is configured to detect a user operation, and trigger the display module 1401 to perform corresponding display in response to the user operation.

Figure 15:
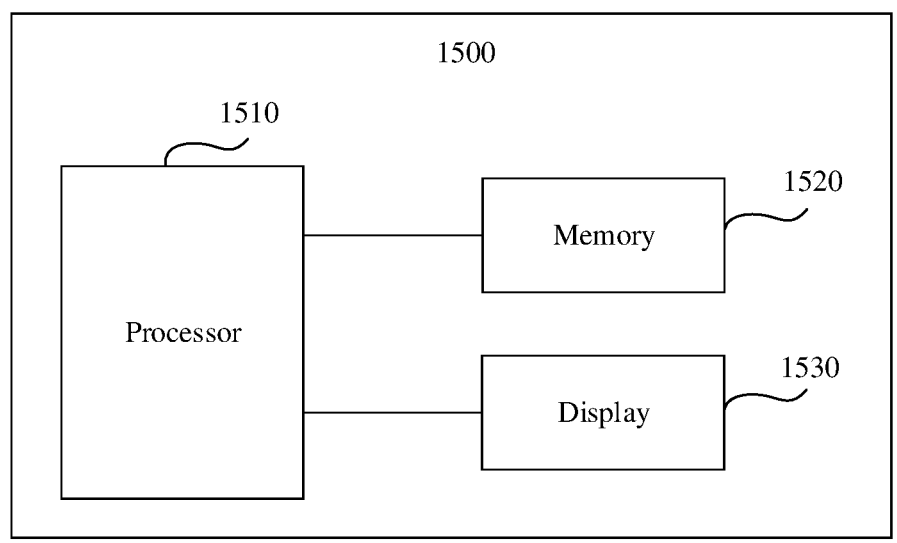
FIG. 15 is a schematic diagram of a structure of another electronic device according to an embodiment of this application.

Based on the same concept, FIG. 15 shows a device 1500 according to this application. The device 1500 includes at least one processor 1510, a memory 1520, and a display 1530. The processor 1510 is coupled to the memory 1520 and the display 1530. A coupling in this embodiment of this application is an indirect coupling or a communication connection between apparatuses, units, or modules, and may be in an electrical, mechanical, or another form, and is used for information exchange between the apparatuses, units, or modules. A connection medium between the display 1530, the processor 1510, and the memory 1520 is not limited in this embodiment of this application. For example, in this embodiment of this application, in FIG. 15, the memory 1520, the processor 1510, and the display 1530 may be connected through a bus. The bus may be classified into an address bus, a data bus, a control bus, and the like.

Specifically, the memory 1520 is configured to store program instructions.

The display 1530 is configured to display a user interface, a window preview region, or the like.

The processor 1510 is configured to invoke the program instructions stored in the memory 1520, so that the device 1500 is enabled to perform the display method shown in FIG. 5A and FIG. 5B or FIG. 13.

In this embodiment of this application, the processor 1510 may be a general-purpose processor, a digital signal processor, an application-specific integrated circuit, a field programmable gate array or another programmable logic component, a discrete gate or transistor logic component, or a discrete hardware component, and can implement or perform the methods, steps, and logical block diagrams disclosed in the embodiments of this application. The general-purpose processor may be a microprocessor, any conventional processor, or the like. The steps of the methods disclosed with reference to the embodiments of this application may be directly performed by a hardware processor, or may be performed by using a combination of hardware in the processor and a software module.

In this embodiment of this application, the memory 1520 may be a non-volatile memory, for example, a hard disk drive (hard disk drive, HDD) or a solid-state drive (solid-state drive, SSD), or may be a volatile memory (volatile memory), for example, a random access memory (random-access memory, RAM). The memory is any other medium that can be configured to carry or store expected program code in a form of an instruction or a data structure and that can be accessed by a computer, but is not limited thereto. The memory in this embodiment of this application may alternatively be a circuit or any other apparatus that can implement a storage function, and is configured to store program instructions and/or data.

It should be understood that the device 1400 and the device 1500 may be configured to implement the methods shown in FIG. 5A and FIG. 5B and FIG. 13 in the embodiments of this application. For related features, refer to the foregoing descriptions. Details are not described herein again.

A person skilled in the art may clearly know that the embodiments of this application may be implemented by using hardware, firmware or a combination thereof. When the embodiments of this application are implemented by using software, the foregoing functions may be stored in a computer-readable medium or transmitted as one or more instructions or code in a computer-readable medium. The computer-readable medium includes a computer storage medium and a communications medium. The communications medium includes any medium that facilitates transmission of a computer program from one place to another. The storage medium may be any available medium accessible by a computer. This is used as an example but is not limited to: The computer-readable medium may include a RAM, a ROM, an electrically erasable programmable read-only memory (electrically erasable programmable read only memory, EEPROM), a compact disc read-only memory (compact disc read-only memory, CD-ROM) or another compact disc storage, a magnetic disk storage medium or another magnetic storage device, or any other medium that can be configured to carry or store expected program code in a form of an instruction or a data structure and that can be accessed by a computer. In addition, any connection may be appropriately defined as a computer-readable medium. For example, if software is transmitted from a website, a server, or another remote source through a coaxial cable, an optical fiber and optical cable, a twisted pair, a digital subscriber line (digital subscriber line, DSL), or wireless technologies such as infrared, radio, and microwave, the coaxial cable, the optical fiber and optical cable, the twisted pair, the DSL, or the wireless technologies such as the infrared, the radio, and the microwave are included in a definition of a medium to which the coaxial cable, the optical fiber and optical cable, the twisted pair, the DSL, or the wireless technologies such as the infrared, the radio, and the microwave belong. A disk (disk) and a disc (disc) that are used in the embodiments of this application include a compact disc (compact disc, CD), a laser disc, an optical disc, a digital video disc (digital video disc, DVD), a floppy disk, and a Blu-ray disc. The disk usually magnetically copies data, and the disc optically copies data by using laser. The foregoing combination should also be included in the protection scope of the computer-readable medium.

In conclusion, what is described above is merely embodiments of this application, but is not intended to limit the protection scope of this application. Any modification, equivalent replacement, or improvement made according to the disclosure of this application shall fall within the protection scope of this application.

What is claimed is:
1. A display method, comprising:
 displaying, by an electronic device, in a first region of a display, a first user interface of a first application, wherein the display further comprises a second region, and wherein the first region does not overlap the second region;
 detecting, by the electronic device, a first operation performed on the first user interface, wherein the first operation is associated with opening a second user interface of the first application;

displaying, by the electronic device, the second user interface in the second region of the display in response to the first operation;

detecting, by the electronic device, a second operation, wherein the second operation is associated with displaying a window preview region;

displaying, by the electronic device, in response to the second operation, the window preview region in a third region of the display, and scaling down the first region to a fourth region and scaling down the second region to a fifth region based on a preset proportion, wherein the first user interface is displayed in the fourth region after the scaling down the first region to the fourth region, the second user interface is displayed in the fifth region after the scaling down the second region to the fifth region, and wherein the third region, the fourth region, and the fifth region do not overlap each other;

detecting, by the electronic device, a third operation performed on the first user interface, wherein the third operation is an operation of dragging the first user interface into the window preview region;

displaying, by the electronic device, in response to the third operation, a first window in the window preview region, and displaying a blank in the fourth region of the display, wherein the first window is a window associated with the first user interface;

detecting, by the electronic device, a fourth operation performed on the first window, wherein the fourth operation is an operation of dragging the first window into the fifth region;

displaying, by the electronic device, in response to the fourth operation, the first user interface in the fifth region, and deleting the first window in the window preview region;

detecting, by the electronic device, an operation of hiding the window preview region; and hiding, by the electronic device, in response to the operation of hiding the window preview region, the window preview region, and scaling up the fourth region to the first region and scaling up the fifth region to the second region based on the preset proportion.

2. A display method, comprising:

displaying, by an electronic device, a window preview region in a first region of a display, wherein the display comprises the first region, a second region and a third region, wherein the first region does not overlap the second region, wherein the third region does not overlap either the first region or the second region, and wherein both the second region and the third region are larger than the first region;

displaying, by the electronic device, a first user interface of a first application in the third region of the display;

displaying, by the electronic device, a second user interface of the first application in the second region of the display;

detecting, by the electronic device, a first operation performed on the first user interface;

displaying, by the electronic device, a first window associated with the first user interface in the window preview region in response to the first operation;

detecting, by the electronic device, a second operation performed on the second user interface;

displaying, by the electronic device, a third user interface of the first application in the third region of the display in response to the second operation;

detecting, by the electronic device, a fourth operation performed on the first window, wherein the fourth operation is associated with displaying the first user interface in at least one of the second region or the third region; and switching, by the electronic device in response to the fourth operation, the second user interface displayed in the second region or the third user interface displayed in the third region to the first user interface associated with the first window.

3. The method according to claim 2, wherein the fourth operation is an operation of dragging the first window into the at least one of the second region or the third region.

4. The method according to claim 2, further comprising:
deleting, by the electronic device, the first window in the window preview region in response to the fourth operation.

5. The method according to claim 2, further comprising:
detecting, by the electronic device, a fifth operation, wherein the fifth operation is associated with hiding the window preview region; and
hiding, by the electronic device, the window preview region in response to the fifth operation.

6. The method according to claim 5, further comprising:
scaling up, by the electronic device, in response to the fifth operation, the second region and the third region based on a preset proportion.

7. The method according to claim 2, further comprising performing, before the detecting the fourth operation performed on the first window:
detecting, by the electronic device, a sixth operation performed on the second user interface, wherein the sixth operation is associated with adding a second window to the window preview region, and wherein the second window is a window associated with the second user interface; and
adding, by the electronic device, the second window to the window preview region in response to the sixth operation.

8. The method according to claim 7, wherein the sixth operation is an operation of dragging the second user interface into the window preview region.

9. The method according to claim 2, further comprising performing, before the displaying the window preview region in the first region:
detecting, by the electronic device, a seventh operation, wherein the seventh operation is associated with displaying the window preview region.

10. The method according to claim 2, wherein the first region is located on at least one of a left side, a right side, an upper side, or a lower side of the display.

11. The method according to claim 2, wherein the first window is at least one of a screenshot of the first user interface, a small card obtained after a screenshot of the first user interface is scaled down, or a scaled-down first user interface.

12. A terminal, comprising:
a display, wherein the display comprises a first region, a second region and a third region, wherein the first region does not overlap the second region, the third region does not overlap either the first region or the second region, and both the second region and the third region are larger than the first region;
one or more processors;

one or more non-transitory memories storing computer instructions for execution by the one or more processors, the computer instructions including instructions for:
- displaying a window preview region in the first region of the display;
- displaying a first user interface of a first application in the third region of the display;
- displaying a second user interface of the first application in the second region of the display;
- detecting a first operation performed on the first user interface;
- displaying, in response to the first operation, a first window associated with the first user interface in the window preview region;
- detecting a second operation performed on the second user interface;
- displaying, in response to the second operation, a third user interface of the first application in the third region of the display;
- detecting a fourth operation performed on the first window, wherein the fourth operation is associated with displaying the first user interface in at least one of the second region or the third region; and
- switching, in response to the fourth operation, to the first user interface associated with the first window, at least one of the second user interface displayed in the second region or the third user interface displayed in the third region.

13. The terminal according to claim 12, wherein the fourth operation is an operation of dragging the first window into the second region or into the third region.

14. The terminal according to claim 12, wherein the computer instructions further include instructions for:
- deleting the first window in the window preview region in response to the fourth operation.

15. The terminal according to claim 12, wherein the computer instructions further include instructions for:
- detecting a fifth operation, wherein the fifth operation is associated with hiding the window preview region; and
- hiding the window preview region in response to the fifth operation.

16. The terminal according to claim 15, wherein the computer instructions further include instructions for:
- scaling up, in response to the fifth operation, the second region and the third region based on a preset proportion.

17. The terminal according to claim 12, wherein the computer instructions further include instructions for performing, before the detecting the fourth operation performed on the first window:
- detecting a sixth operation performed on the second user interface, wherein the sixth operation is associated with adding a second window to the window preview region, and wherein the second window is a window associated with the second user interface; and
- adding the second window to the window preview region in response to the sixth operation.

18. The terminal according to claim 17, wherein the sixth operation is an operation of dragging the second user interface into the window preview region.

19. The terminal according to claim 12, wherein the computer instructions further include instructions for performing, before the displaying the window preview region in the first region:
- detecting a seventh operation, wherein the seventh operation is associated with displaying the window preview region.

20. The terminal according to claim 12, wherein the first region is located on at least one of a left side, a right side, an upper side, or a lower side of the display.

* * * * *

UNITED STATES PATENT AND TRADEMARK OFFICE
CERTIFICATE OF CORRECTION

| | | |
|---|---|---|
| PATENT NO. | : 11,747,953 B2 | Page 1 of 1 |
| APPLICATION NO. | : 17/631022 | |
| DATED | : September 5, 2023 | |
| INVENTOR(S) | : Xiuping Jiang | |

It is certified that error appears in the above-identified patent and that said Letters Patent is hereby corrected as shown below:

In the Specification

In Column 15, Line 66, delete "1C." and insert -- 10C. --.

In Column 18, Line 9, delete "oi;" and insert -- 01; --.

Signed and Sealed this
Twenty-eighth Day of November, 2023

*Katherine Kelly Vidal*

Katherine Kelly Vidal
*Director of the United States Patent and Trademark Office*